United States Patent [19]

Hunt et al.

[11] Patent Number: 5,426,934
[45] Date of Patent: Jun. 27, 1995

[54] ENGINE AND EMISSION MONITORING AND CONTROL SYSTEM UTILIZING GAS SENSORS

[75] Inventors: Frank W. Hunt, Walled Lake; Masayoshi Kaneyasu, Farmington Hills; George Saikalis, West Bloomfield, all of Mich.

[73] Assignee: Hitachi America, Ltd., Tarrytown, N.Y.

[21] Appl. No.: 15,930

[22] Filed: Feb. 10, 1993

[51] Int. Cl.$^6$ ............................... F01N 3/20
[52] U.S. Cl. .............................. 60/276; 60/277; 60/278; 123/688; 123/691
[58] Field of Search ............... 60/276, 277, 278; 123/691, 688

[56] References Cited

U.S. PATENT DOCUMENTS

| | | | |
|---|---|---|---|
| 4,079,714 | 3/1978 | Saito | 123/699 |
| 4,638,443 | 1/1987 | Kaneyasu et al. | |
| 5,175,997 | 1/1993 | Blanke | 60/277 |
| 5,233,934 | 8/1993 | Krigmont | 422/171 |
| 5,259,189 | 11/1993 | Baier | 60/277 |

*Primary Examiner*—Douglas Hart
*Attorney, Agent, or Firm*—Gifford, Krass, Groh, Sprinkle, Patmore, Anderson & Citkowski

[57] ABSTRACT

An engine monitoring system and/or emission reduction system is provided for use in conjunction with an internal combustion engine. The system includes a plurality of sensors which detect various engine operating conditions and in which each sensor generates an output signal representative of its particular engine operating condition. At least one of these sensors is a gas sensor associated with the exhaust system which produces an output signal indicative of the concentration of nitric oxides in the exhaust emissions and which has an output which varies as a function of the concentration of such nitric oxides. A central processing unit receives inputs from the various engine sensors and, in accordance with preprogrammed algorithms, monitors the engine for failure and/or deterioration of various components in the emission reduction system as well as the various engine sensors. The processing unit further generates output signals which controls the operation of various engine components to optimize the operating condition of the engine as well as to meet governmental standards relating to engine emissions.

34 Claims, 11 Drawing Sheets

ENGINE AND EMISSION MONITORING AND CONTROL SYSTEM UTILIZING GAS SENSORS

BACKGROUND OF THE INVENTION

I. Field of the Invention

The present invention relates to a system for monitoring selected engine components of an internal combustion engine as well as controlling selected engine components to optimize engine operation and reduce exhaust emissions.

II. Description of the Prior Art

The operation and exhaust emissions of internal combustion engines of the type used in automobiles and trucks are dependent upon the air/fuel (A/F) ratio of the engine. These operational characteristics are typically expressed as a function of the air excess ratio $\lambda$ which is defined by the following equation:

$$\lambda = \frac{A/F}{A/F_{st}}$$

where $A/F_{st}$ is the stoichiometric air/fuel ratio.

With reference now to FIG. 1 which illustrates the air/fuel (A/F) ratio versus engine emissions, a lean A/F mixture ($\lambda > 1$) results in lower carbon monoxide and hydrocarbon emissions in the exhaust emission, but higher concentrations of nitrous oxides (NOx). Conversely, a rich A/F ratio operating condition ($\lambda < 1.0$) results in greater engine power but also higher carbon monoxide and higher hydrocarbon emissions. However, during a rich engine operating condition, the concentration of nitric oxides is reduced.

Still referring to FIG. 1, the concentration of oxygen ($O_2$) in the exhaust emissions is very small for values of $\lambda < 1.0$. These small concentrations of oxygen occur because substantially all of the oxygen is combusted with the fuel during a rich engine operating condition. Conversely, the concentration of oxygen in the exhaust emissions increases during a lean engine operating condition ($\lambda > 1$) since there is insufficient fuel to totally combust with the oxygen.

In order to reduce the concentration of noxious emissions in the exhaust emissions from internal combustion engines, it has been previously known to use a three way catalytic converter (TWC) in series with the exhaust combustion products from the internal combustion engine. Such three way converters effectively reduce the amount of hydrocarbons, carbon monoxide and NOx in the exhaust emissions from the engine.

One limitation of the three way catalytic converters, however, is that they operate efficiently only in a very narrow band centered around the stoichiometric A/F ratio ($\lambda = 1$). Consequently, in order for the engine emission control system for these previously known systems to operate effectively, the emission control system must determine if the A/F mixture is at the stoichiometric point. If not, the three way catalytic converter will not adequately remove the noxious engine emissions from the engine exhaust.

In order to determine engine operation at the stoichiometric A/F mixture, these previously known engines have utilized an oxygen sensor, also known as a $\lambda$ sensor, which is operatively positioned in the exhaust gas stream from the engine. These previously known oxygen sensors produce a first output signal in the absence of oxygen in the exhaust gas stream and, conversely, produce a second signal when oxygen is detected in the exhaust gas stream from the engine. Consequently, the presence of the first signal from the oxygen detector is an indication that the engine is operating with a rich A/F mixture since there is an absence of oxygen in the exhaust gas stream while, conversely, the presence of the second signal from the oxygen sensor is indicative of a lean A/F mixture due to the presence of oxygen in the exhaust gas stream.

Thus, while these previously known oxygen sensors have been adequate for determining whether the engine was operating with a rich or lean A/F mixture, such oxygen sensors were inadequate for determining the actual value of $\lambda$ and thus the degree of richness or leanness of the air/fuel mixture. Determination of the actual value of $\lambda$, however, would be highly advantageous in order to optimize the engine operation as well as reduce undesirable engine emissions.

A still further disadvantage of these previously known engine control systems is that no provision was made in such control systems for monitoring the operation of the various engine components and especially those components involved in the reduction of undesirable engine emissions. Consequently, deterioration or complete failure of an engine component, such as the three way converter, would result in the unacceptable exhaust of noxious engine emissions from the engine and yet be undetected by the control system for the engine. Likewise, none of these previously known systems incorporate any means for monitoring the status of the various sensors used both in the control of the engine combustion as well as in the reduction of undesirable engine emissions.

SUMMARY OF THE INVENTION

The present invention provides an engine control and engine monitoring system which overcomes all of the above mentioned disadvantages of the previously known devices.

In brief the control system of the present invention is designed for use with an internal combustion engine having a three way catalytic converter in series with the exhaust gas stream from the engine. The output from the three way catalytic converter, in turn, flows through a NOx catalyst and ultimately is exhausted to the atmosphere.

The control system of the present invention includes a plurality of sensors, each of which monitors a particular engine operating condition or characteristic and provides an output signal representative thereof. These output sensors include a mass air flow sensor into the engine, a throttle position sensor and an air/fuel (A/F) sensor.

Unlike the previously known engine control systems, a gas sensor which produces an output signal which varies as a function of the concentration of NOx in the exhaust gases is exposed to the output from the three way catalytic converter. This NOx sensor also preferably produces an output signal as a function of the hydrocarbons which may be present in the exhaust gas stream from the three way catalytic converter. A second NOx sensor is also preferably positioned in the exhaust gas stream from the NOx catalytic converter.

The outputs from the various engine sensors are all coupled as input signals to a central processing unit which iteratively reads and processes the output signals from the sensors in accordance with preprogrammed algorithms. As a result of such algorithms, the central processing unit performs two distinct functions.

First, the central processing unit utilizes the output signals from the sensor to monitor the status of various engine components such as the three way catalytic converter, the NOx catalytic converter, and the individual sensors themselves as well as engine operation. When deterioration or failure of any of these engine components is determined by the central processing unit in accordance with its preprogrammed algorithms, the central processing unit provides an output indicator signal to the engine operator, typically the driver of the automobile or truck, so that the operator becomes aware that automotive service is required.

Secondly, the central processing unit utilizes the output signals from the various sensors to control the emission reduction systems for the engine. Such reduction systems include, for example, exhaust gas recirculation, the introduction of secondary air into the three way catalytic converter, the introduction of air assist into the fuel injection for the engine and/or the spark advance control for the engine.

The actual algorithms to monitor the various engine components as well as control the various engine operating controls for the engine will be subsequently described in greater detail.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 2A:
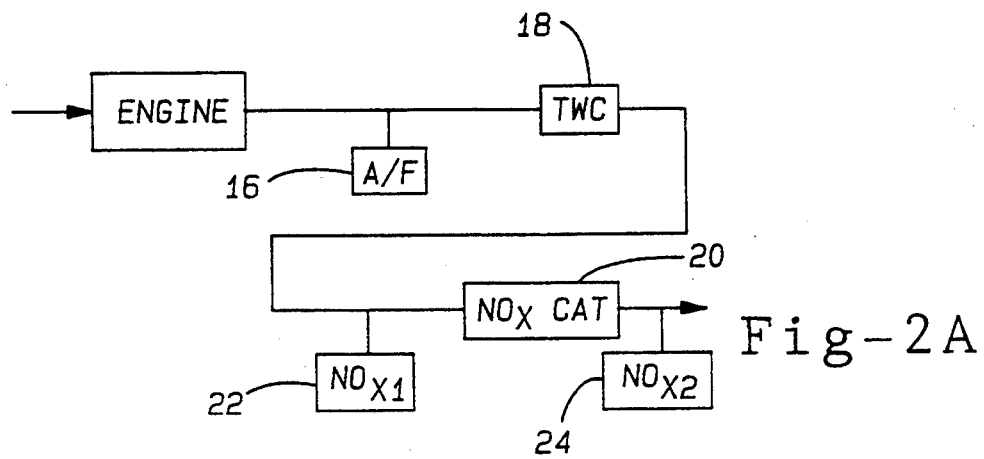
FIGS. 2A and 2B are diagrammatic views illustrating a preferred embodiment of the present invention.
Figure 2B:
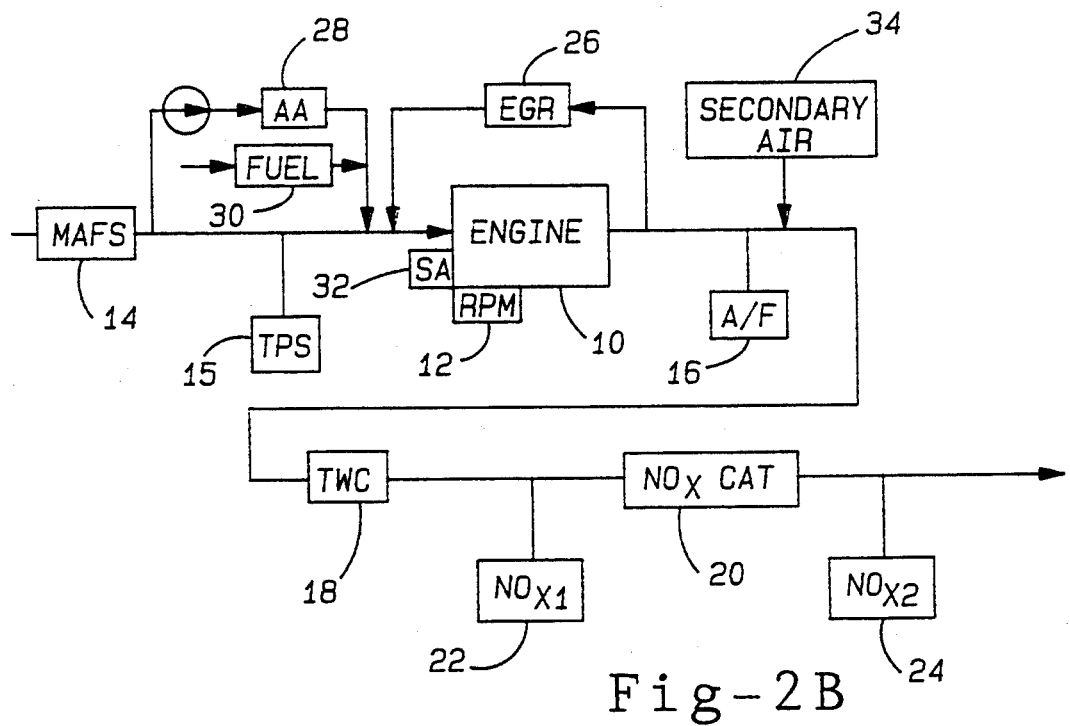

With reference first to FIGS. 2A and 2B (hereinafter collectively referred to as FIG. 2), a diagrammatic view of a control and monitoring system for an internal combustion engine 10 is thereshown. The internal combustion engine 10 is of the type found in automobiles, truces and the like. FIG. 2A represents a basic diagrammatic view of the preferred embodiment of the present invention while FIG. 2B is a diagrammatic view of the present invention with improvements.

A plurality of sensors are associated with the engine 10, each of which produces an output signal representative of a particular engine operating condition. These sensors include a revolutions per minute (RPM) sensor 12 which detects rotation of the crankshaft via a crank angle sensor and then by extend means calculates the RPM for the engine. As used in this application, the RPM sensor 12 includes the external means which generates an output signal representative of the speed of the engine 10.

The sensors further include a mass air flow sensor (MAFS) 14 which measures the mass air flow into the intake of the engine 10 or throttle position sensor 15 as well as an AIR/FUEL sensor 16 which produces an output signal representative of the AIR/FUEL mixture of the engine.

The exhaust gas stream from the engine 10 flows through a three way catalytic converter 18 which reduces hydrocarbons, carbon monoxide and nitric oxides (NOx) contained in the exhaust gas stream from the engine 10. The output from the three way converter 18, in turn, flows through a NOx catalytic converter 20 which further reduces any NOx in the exhaust gas stream from the three way converter 18 and the output from the NOx converter 20 is thereafter exhausted to atmosphere.

Still referring to FIG. 2, a gas sensor 22 is operatively positioned in the exhaust gas stream between the three way converter and the NOx converter 20. A second gas sensor 24 is also preferably, but optionally, operatively positioned in the exhaust gas stream from the NOx converter 20.

Figure 3:
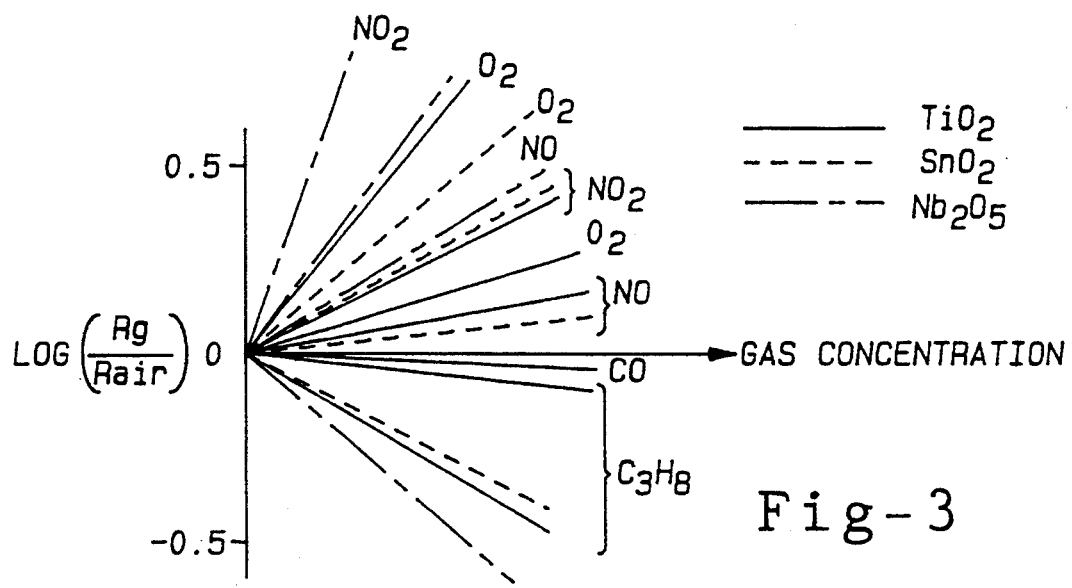
FIG. 3 is a graph illustrating outputs from a NOx sensor as a function of gas concentration.

With reference now to FIG. 3, the gas sensors 22 and 24 provide an output signal which varies as a function of the concentration of nitrous oxide, oxygen and hydrocarbons in the exhaust emissions from the three way converter 18 and NOx converter 20, respectively. As shown in FIG. 3, the gas sensor 22 or 24 is preferably constructed from either tin oxide ($SnO_2$), titanium oxide ($TiO_2$) or niobium oxide ($Nb_2O_5$). The resistance of such materials increases logarithmically with gas concentration of NOx and $O_2$. Conversely, the resistance of such materials decreases logarithmically with a gas concentration of hydrocarbons, such as propane ($C_3H_8$). The variations in the resistance of these materials with reference to their resistance in air is plotted in FIG. 3 as a function of the gas concentration.

Figure 4:
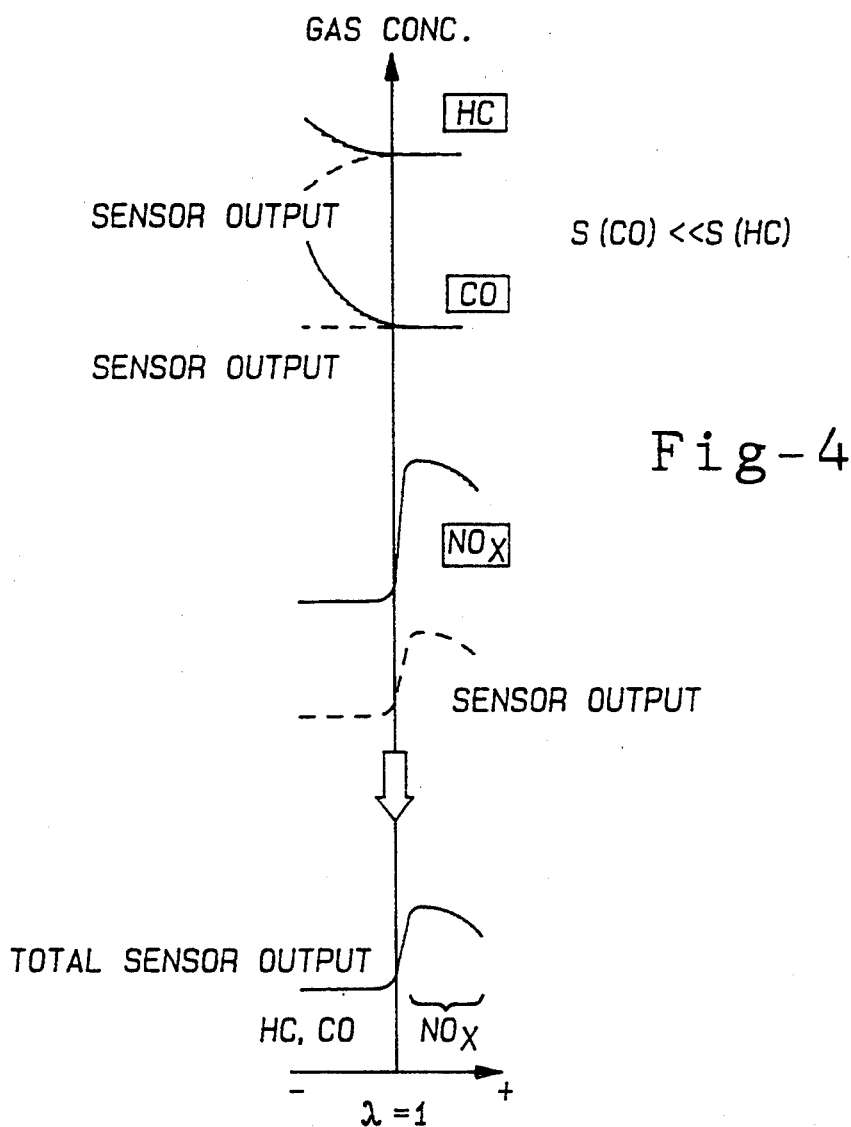
FIG. 4 is a view illustrating the concentration of noxious gas emissions following treatment by a three way catalytic converter.

With reference now to FIG. 4, the gas concentration of hydrocarbons, carbon monoxide and NOx from the three way catalytic converter 18 are plotted as a function of the air excess ratio λ. For values of λ>1, i.e. a lean burn condition, the concentration of hydrocarbons and carbon monoxide in the exhaust from the three way converter 18 is virtually negligible while the concentration of NOx increases. Conversely, during a rich engine operating condition, i.e. λ<1, the concentration of NOx in the output from the three way converter 18 is negligible while both carbon monoxide and hydrocarbon content of the exhaust gas stream from the three way converter 18 increases.

Consequently, the gas sensors 22 and 24 can be used to effectively measure the excess air ratio λ for both lean and rich fuel concentrations. A decrease in the resistance from the gas sensor 22 or 24 is indicative of a rich AIR/FUEL mixture (λ<1) during which the concentration of NOx in the exhaust gases is so negligible that it can be disregarded and, instead, the output from the sensor can be treated as reading only the hydrocarbon concentration in the exhaust gases. The actual value of the air excess ratio λ can be determined empirically from the magnitude of the sensor output.

Conversely, when the resistance from the gas sensor 22 or 24 increases, the increase can be attributable to the increase in both NOx and oxygen, both of which increase during a lean A/F mixture, i.e. λ>1. During such an engine operating condition, furthermore, the amount of hydrocarbons and carbon monoxide in the exhaust gas stream is so negligible (FIG. 4) that both the hydrocarbon and carbon monoxide content can be disregarded. In this case, the output from the gas sensor 22 or 24 may be treated as only measuring both the oxygen and NOx content in the exhaust gas stream. As before, the actual value of λ can be determined empirically as a function of the magnitude of the output signal from the gas sensors 22 and 24.

Referring again to FIG. 2, the engine control system includes a number of individual controls which vary the operation of not only the engine 10, but also the content of undesirable noxious emissions in the exhaust gas stream. These control systems include, for example, an exhaust gas recirculation stem 26, an air assist system 28, a fuel injection system 30, a spark advance system 32, and a secondary air system 34. All of these systems 26-34 will be subsequently described in greater detail.

Figure 5:
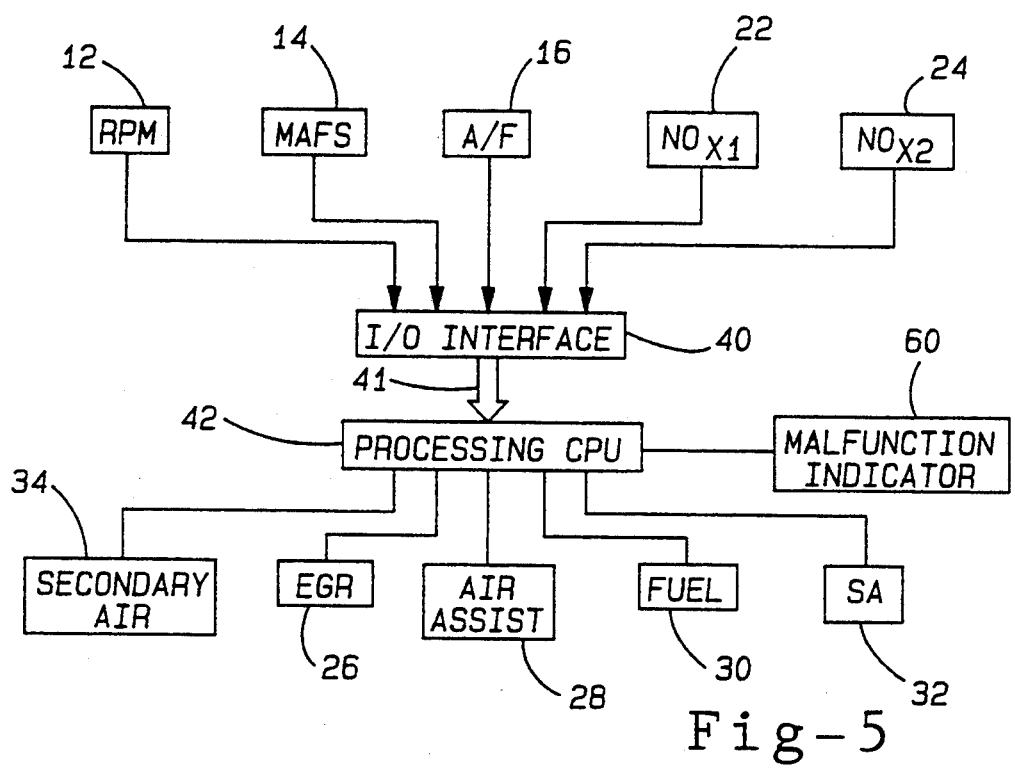
FIG. 5 is a schematic view illustrating a preferred embodiment of the present invention.

With reference now to FIG. 5, the output signals from the engine monitoring sensors 12, 14, 16, 22, 24, as well as any other sensors that may be present, are electrically connected as input signals through an input interface circuit 40 which, in turn, has its output bus 41 connected as an input signal bus to a central processing unit 42. The central processing unit (CPU) 42 can, for example, comprise a single chip microprocessor. Conventional random access memory (RAM) and/or read only memory (ROM) contain the program algorithms for the central processing unit 42 and such memory is contained either internally or externally of the CPU 42.

The CPU 42 provides a plurality of output signals to control the various engine control systems associated with the engine. Thus, the CPU 42 provides an output signal to the secondary air system 34 to control the introduction of secondary air in a fashion to be subsequently described. Similarly, the CPU provides an output signal to the exhaust gas recirculation system 26 to vary the amount of exhaust recirculation, also in a fashion to be subsequently described.

Similarly, the CPU 42 provides output signals to both the air assist system 28, fuel system 30 and spark advance timing system 32 in order to control the operation of these systems to optimize engine operation and/or reduce exhaust emissions.

The CPU 42 also provides output signals to an indicator means 60 to alert the operator of malfunction of selected engine components.

Having described the component parts of the system of the present invention, the monitoring and control system of the present invention will now be described.

MONITORING SYSTEM

NOx CATALYTIC CONVERTER MONITORING

Figure 6A:
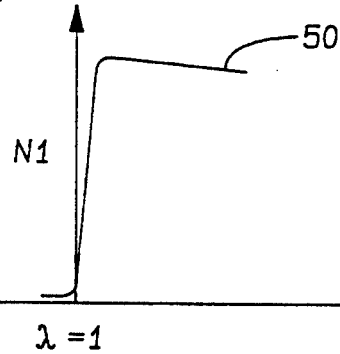
FIGS. 6A and B are graphs illustrating outputs from a NOx sensor in accordance with monitoring of a NOx catalytic converter.
Figure 6B:
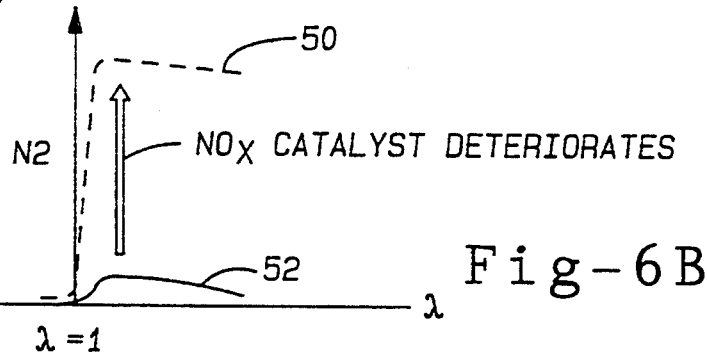
Figure 7:
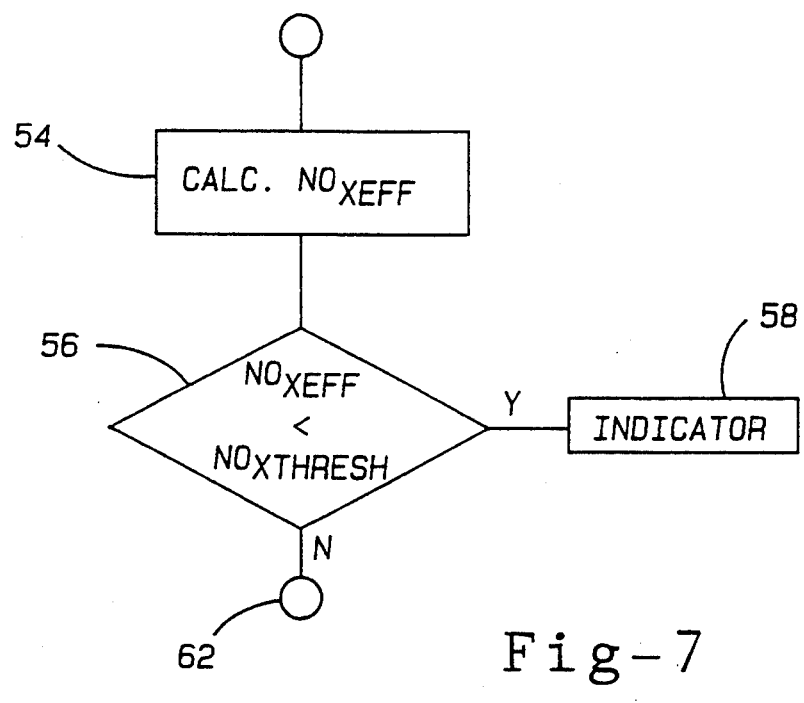
FIG. 7 is an algorithm for monitoring a NOx catalytic converter.

With reference now to FIGS. 6 and 7, the monitoring of the NOx catalytic converter 20 (FIG. 2) will now be described.

FIG. 6A depicts the output signal N1 from the NOx1 sensor 22 as shown by graph 50. The output signal N1 from the NOx1 sensor increases as λ>1, i.e. a lean burn engine combustion situation. The NOx signal N1 thus represents the presence of NOx in the exhaust gas stream from the three way converter 18 (FIG. 2).

The output N2 from the NOx2 sensor 24 is depicted in FIG. 6B as graph 52 during normal operation. Since the NOx catalytic converter 20 should reduce the concentration of NOx in the exhaust gas stream, the output N2 from the NOx2 sensor 24 should be less than the signal N1 from the NOx1 sensor assuming proper operation of the NOx catalytic converter 20.

However, deterioration or failure of the NOx catalytic converter 20 increases the concentration of NOx in the exhaust gas stream from the NOx converter 20 as measured by the NOx2 sensor as N2 so that the concentration of NOx, as depicted by graph 52 in FIG. 6B, increases and approaches the output signal N1 from the NOx1 sensor as indicated by graph 50. In a complete failure of the NOx converter 20, the output signal from both the NOx1 sensor 22 (N1) and NOx2 sensor 24 (N2) should be substantially the same.

It is therefore possible to calculate the efficiency of the NOx catalytic converter 20 through the following equation:

$$NOx \text{ CATALYTIC EFFICIENCY } (NOx_{EFF}) =$$

or $$\frac{Nox1 \text{ SENSOR OUTPUT} - NOx2 \text{ SENSOR OUTPUT}}{NOx1 \text{ SENSOR OUTPUT}}$$

$$NOx_{EFF} = \frac{N1 - N2}{N1}$$

Application of the alcove formula will thus generate an efficiency value for the NOx catalytic converter between zero and 1.0 with the value of 1.0 indicative of an efficient operation of the catalytic converter 20 and zero indicating failure of the NOx catalytic converter 20.

With reference now to FIG. 7, a computer algorithm is there illustrated to monitor the efficiency of the NOx catalytic converter 20. At step 54 the computer program calculates the value of $NOx_{EFF}$, i.e. the efficiency of the catalytic converter, by applying the above-identified formula. Step 54 then branches to step 56 which compares the calculated value of the NOx catalytic converter efficiency ($NOx_{EFF}$) with a predetermined threshold $NOx_{THRESH}$. If the value of the NOx converter efficiency $NOx_{EFF}$ is less than the threshold value $NOx_{THRESH}$, step 56 branches to step 58 which then activates the indicator means 60 (FIG. 5) thus alerting the vehicle operator of the failure or deterioration of the NOx catalytic converter.

Conversely, if the value of the NOx converter efficiency $NOx_{EFF}$ is greater than its threshold value $NOx_{THRESH}$, step 56 branches to step 62 and exits from the NOx converter monitoring routine or program illustrated in FIG. 7.

NOX1 SENSOR MONITORING

Figure 8:
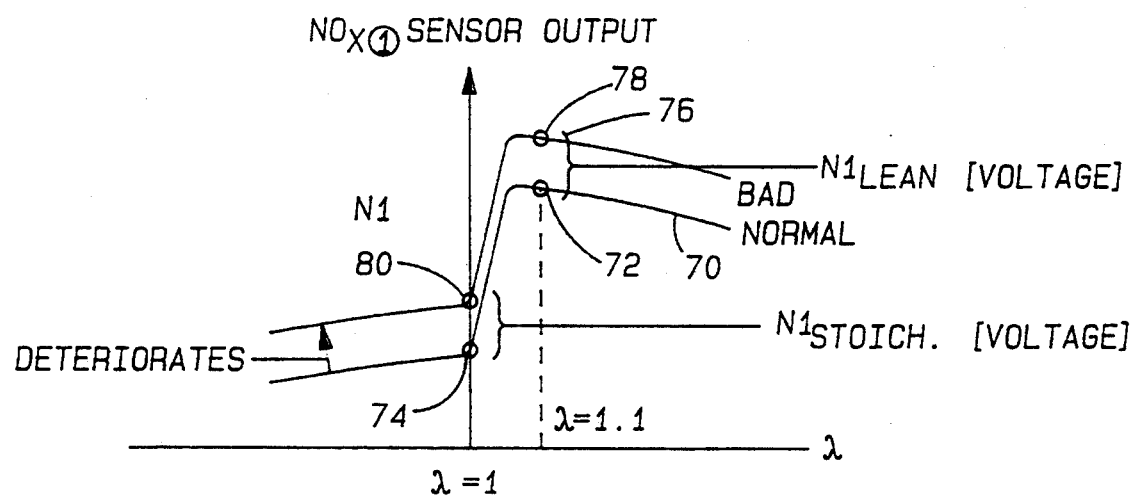
FIG. 8 is a view illustrating outputs from a NOx sensor as a function of the air excess ratio $\lambda$ and deterioration of the NOx sensor.

With reference now to FIG. 8, the output N1 from the NOx1 sensor during normal operation of the NOx1 sensor is depicted by graph 70 which illustrates the value of the NOx1 sensor output (N1) as a function of $\lambda$. Thus, the value of $N1_{lean}$ at predetermined value of $\lambda$ (for example $\lambda = 1.1$) is illustrated at point 72 during normal operation of the NOx1 sensor. Similarly, point 74 illustrates the value of $N1_{STOICH}$ ($\lambda = 1$). The values of N1 at both points 72 and 74 can be determined empirically and, similarly, the ratio of $N1_{lean}$ over $N1_{STOICH}$ falls within a predetermined range during normal operation of the NOx1 sensor.

When the NOx1 sensor deteriorates, however, the output N1 from the NOx1 sensor increases as depicted by graph 76 in FIG. 8. Simultaneously the value of the ratio of $N1_{lean}$, indicated at point 78 over $N1_{STOICH}$ (point 80) decreases. This decrease in the ratio $N1_{lean}/N1_{STOICH}$ is then employed to detect a malfunction or deterioration of the NOx1 sensor.

Figure 9:
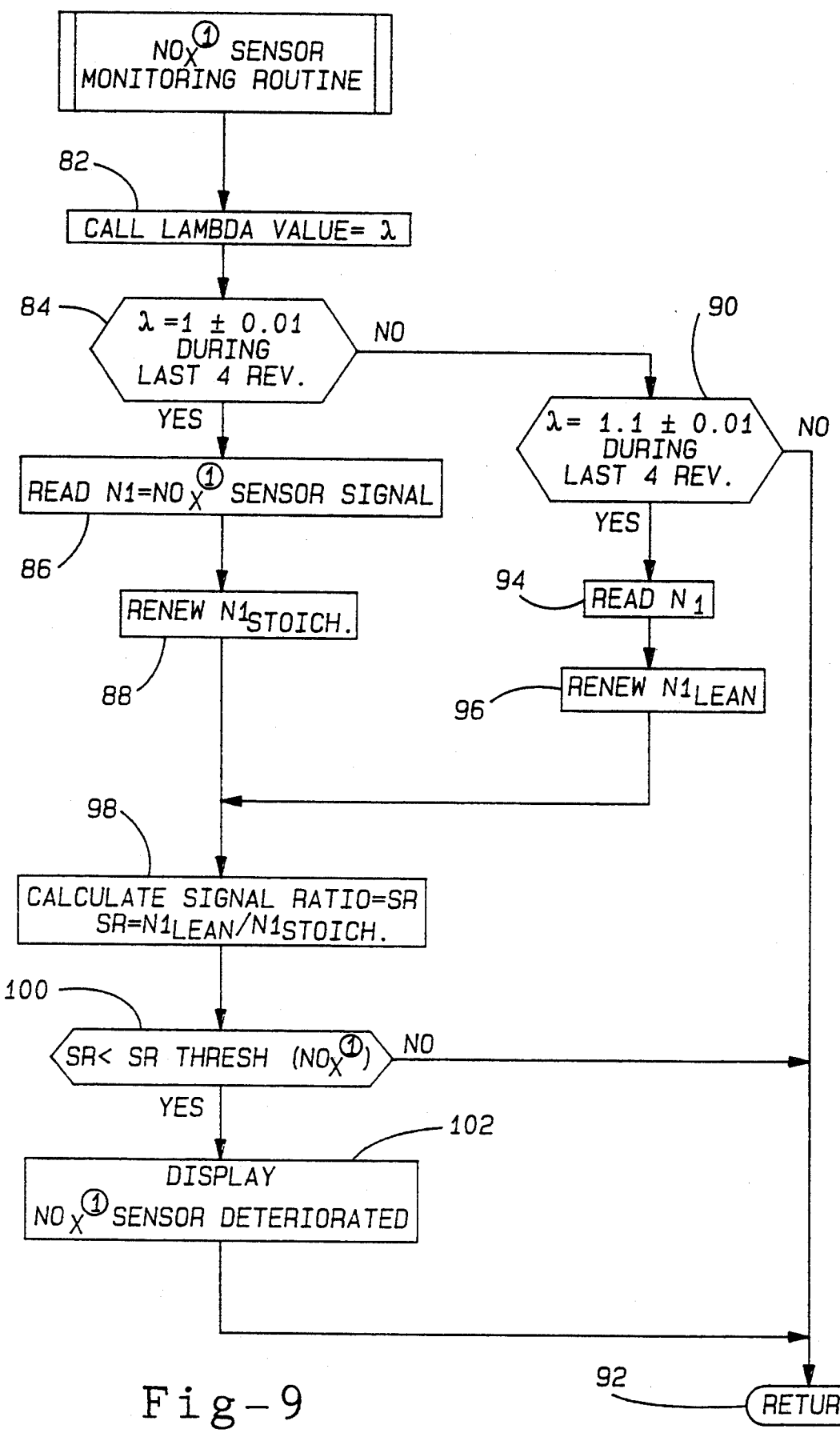
FIG. 9 is an algorithm for monitoring the NOx1 sensor.

With reference now to FIG. 9, an algorithm is thereshown for detecting deterioration or malfunction of the NOx1 sensor. At step 82, the value of $\lambda$ is first determined and step 82 then branches to step 84. Step 84 then determines if $\lambda$ is at or near the stoichiometric point ($\lambda = 1.0 \pm 0.01$) for at least a predetermined cycle, for example four revolutions of the engine. If so, step 84 branches to step 86 whereupon the value of N1 is read from the NOx1 sensor. Step 86 then branches to step 88 whereupon the value of $N1_{STOICH}$ is updated.

Assuming that $\lambda$ is not at its stoichiometric point at step 84, step 84 instead branches to step 90 which determines if $\lambda$ is within a preset range of lean engine operation. As shown at step 90, this preset range is selected as $\lambda = 1.1 \pm 0.01$ although other values can alternatively be used. Step 90 also determines whether the value of $\lambda$ is at the preselected lean operating range of 1.1 during a preselected time period, for example four revolutions of the engine. If not, step 90 branches to step 92 and exits from the NOx1 sensor monitoring routine.

Assuming that the engine operation is within the preselected lean operating range of 1.1, step 90 instead branches to step 94 where the value NI from the NOx1 sensor is read. Step 94 then branches to step 96 which updates the value of $N1_{lean}$.

After the values of both $N1_{STOICH}$ and $N1_{Lean}$ have been determined respectively at steps 88 and 96 (during different iterations of the algorithm of FIG. 9), steps 88 and 96 both branch to step 98 in which the algorithm calculates the following signal ratio are:

$$SR = \frac{N1_{lean}}{N1_{STOICH}}$$

Step 98 then branches to step 100 in which the calculated signal ratio SR is compared with a threshold value for the signal ratio $SP_{THRESH(NOx1)}$. The value of the threshold value $SR_{THRESH(NOx1)}$ for the signal ratio is determined empirically for the particular engine and exhaust system.

When the calculated value SR for the signal ratio is greater than its threshold value $SR_{THRESH(NOx1)}$, this is an indication that the NOx1 sensor is operating satisfactorily. When this occurs, step 100 branches to step 92 and the NOx sensor monitoring routine is completed.

Conversely, when the signal ratio SR is less than its threshold value $SR_{THRESH(NOx1)}$, the NOx1 sensor has deteriorated. When this occurs, step 100 branches to step 102 whereupon the central processing unit 42 (FIG. 5) activates the appropriate indicator signal 60 indicating a malfunction of the NOx1 sensor. The vehicle operator is then alerted that maintenance is required.

THREE WAY CATALYTIC CONVERTER MONITORING

Figure 10:
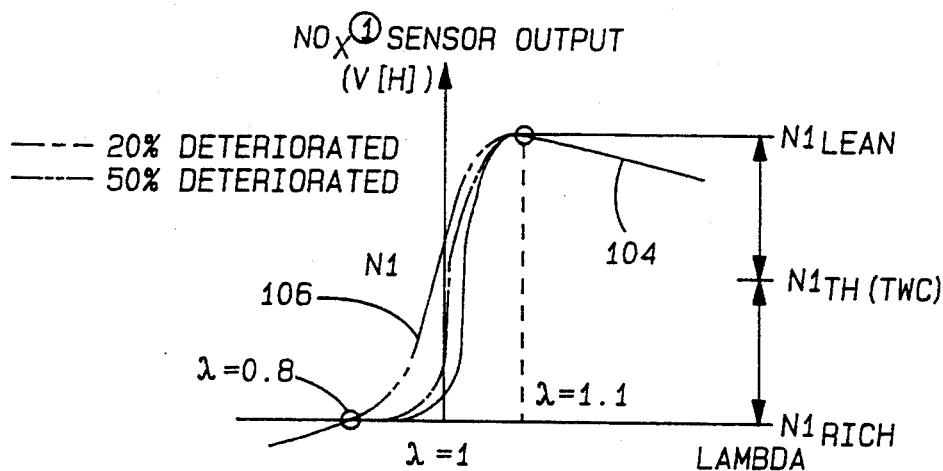
FIG. 10 is a graph illustrating the output from the NOx1 sensor as a function of the air excess ratio and deterioration of the three way catalytic converter.

With reference now to FIG. 10, FIG. 10 depicts the output N1 from the NOx1 sensor as a function of $\lambda$. Graph 104 illustrates the output N1 from the NOx1 sensor during normal operation of the three way catalytic converter (TWC). During normal operation, the output from the NOx1 sensor remains very low until the stoichiometric point ($\lambda = 1$). After the stoichiometric point, the output from the NOx1 sensor increases rapidly and reaches a peak at a predetermined lean burning condition, for example $\lambda = 1.1$.

Figure 1:
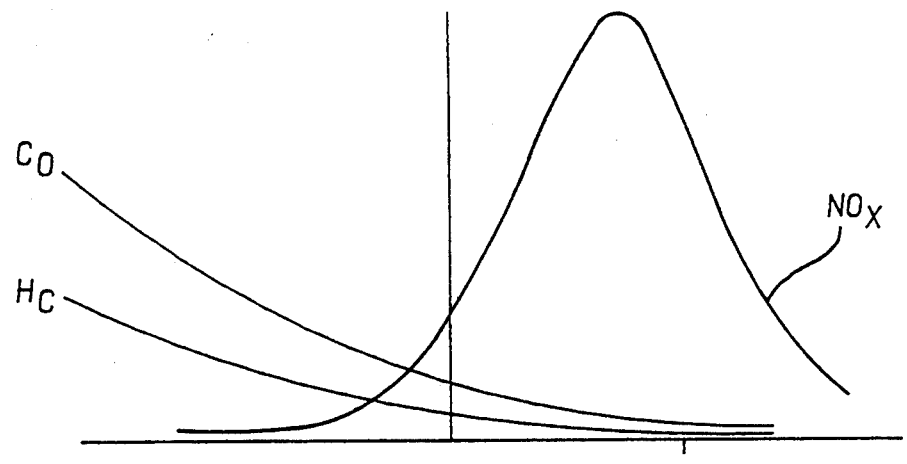
FIG. 1 is a graph illustrating the relationship of noxious engine emissions as a function of the air excess ratio $\lambda$.

Still referring to FIG. 1, deterioration of the TWC will cause an increase in the output N1 from the NOx1 sensor as depicted by the dashed line 106 in FIG. 10. Consequently, the presence of NOx in the exhaust gas stream increases substantially at the stoichiometric point ($\lambda = 1$) for the engine. This increase in the signal N1 from the NOx1 sensor can be used to effectively monitor the TWC.

Figure 11:
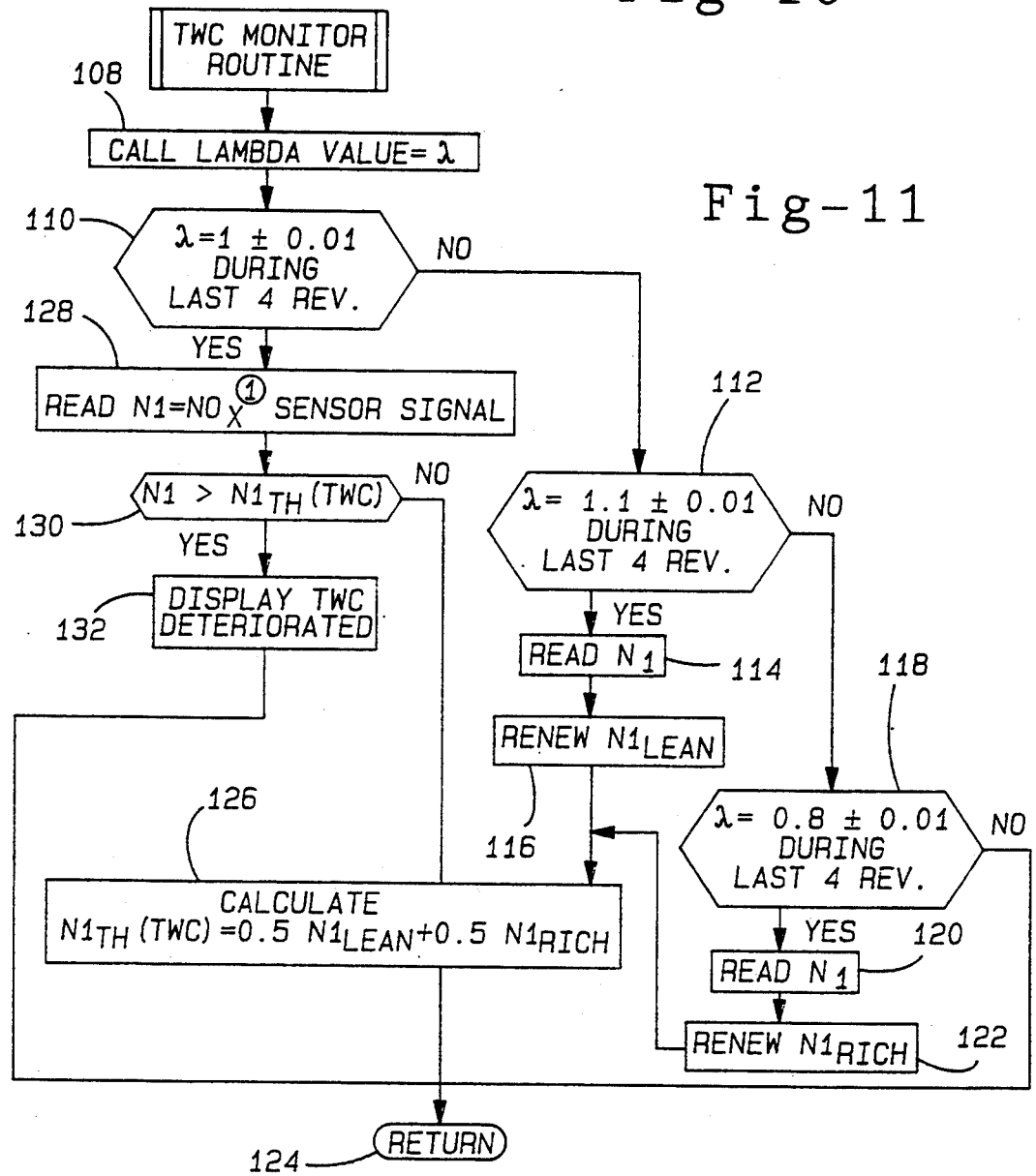
FIG. 11 is an algorithm for monitoring the operation of the three way catalytic converter.

With reference now to FIG. 11, an algorithm or routine to monitor the TWC is there illustrated. At step 108, the value of $\lambda$ is first determined and step 108 then branches to step 110. Step 110 determines if the value of $\lambda$ is at a small range around the stoichiometric point ($\lambda = 1.0 \pm 0.01$) during a predetermined cycle, for example four revolutions of the engine. If the engine operation is not at its stoichiometric point, step 110 branches to step 112 which determines if the engine operation is at a predetermined lean burning condition, for example $\lambda = 1.1 \pm 0.01$. If so, step 112 branches to step 114 which reads the value N1 from the NOx1 sensor. Step 114 then branches to step 116 which updates the value of $N1_{lean}$.

Assuming that $\lambda$ is not at the preselected lean burning condition, step 112 instead branches to step 118. Step 118 then determines if $\lambda$ is at a preselected rich AIR/FUEL mixture, for example $\lambda = 0.8 \pm 0.01$, during the last four revolutions of the engine. If so, step 118 branches to step 120 which reads the value N1 from the NOx sensor. Step 120 then branches to step 122 which updates the value of $N1_{rich}$.

Assuming that $\lambda$ is neither at the stoichiometric point ($\lambda = 1$), the preselected lean point ($\lambda = 1.1$) or the preselected rich condition ($\lambda = 0.8$), step 118 branches immediately to step 124 and exits from the TWC monitoring routine.

After steps 116 and 122 have respectively renewed the values for $N1_{lean}$ and $N1_{rich}$, steps 116 and 122 both branch to step 126 where a threshold value $N1_{THRESH(TWC)}$ is calculated in accordance with the following formula:

$$N1_{THRESH(TWC)} = \frac{N1_{lean} + N1_{rich}}{K}$$

This threshold point $N1_{THRESH(TWC)}$ is also illustrated in FIG. 10. As described below, this threshold value is then used to determine a malfunction of the TWC. Furthermore, as is clear from FIG. 10, in the event of deterioration of the TWC as depicted by graph 106, the value N1 from the NOx1 sensor exceeds the threshold value $N1_{THRESH(TWC)}$ at the stoichiometric point ($\lambda = 1$).

Consequently, in order to monitor a malfunction of the TWC and again referring to FIG. 11, if the engine is operating at its stoichiometric point, step 110 branches to step 128 which reads the value N1 from the NOx1 sensor. Step 128 then branches to step 130 which compares the value N1 from the NOx sensor at the stoichiometric point at the threshold value $N1_{THRESH(TWC)}$. If the value of N1 exceeds its threshold, step 130 branches to step 132, indicative of a malfunction of the TWC, and the central processing unit 42 (FIG. 5) activates the appropriate indicator means 60 to alert the operator that maintenance is required.

Conversely, if the TWC is operating effectively, the value N1 from the NOx1 sensor at the stoichiometric point is less than the threshold value $N1_{THRESH(TWC)}$. When this occurs, step 130 exits directly to step 124 and exits from the TWC monitoring routine.

AIR/FUEL SENSOR MONITORING

Figure 12:
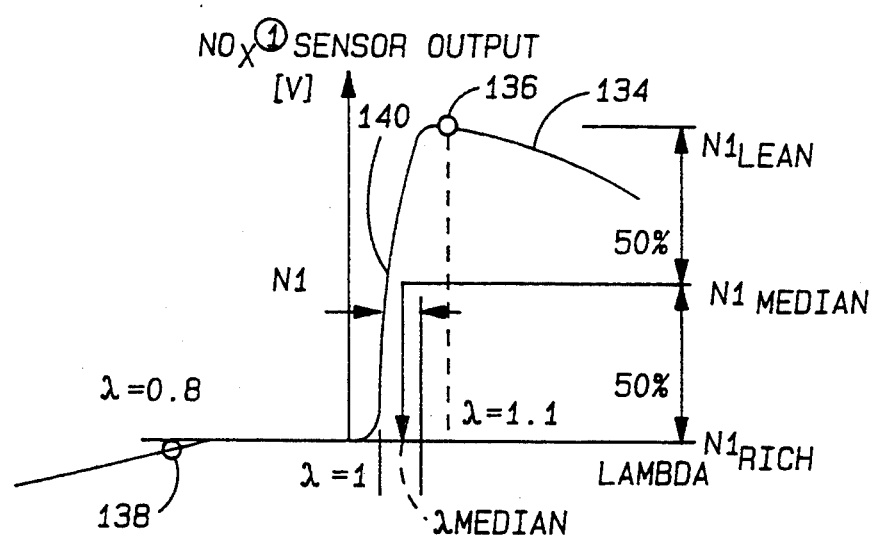
FIG. 12 is a graph of the output from the NOx1 sensor as a function of the air excess ratio in relation to the monitoring of the AIR/FUEL sensor.

With reference to FIG. 12, the output N1 from the NOx1 sensor is thereshown by graph 134 as a function of $\lambda$. Thus, a median value of the NOx1 sensor $N1_{MEDIAN}$ can be determined by the average of a lean burning condition $N1_{lean}$, e.g. $\lambda = 1.1 \pm 0.01$ as illustrated at point 136 and a rich burning condition $N1_{rich}$, e.g. $\lambda = 0.8 \pm 0.01$ as indicated at point 138. This median value $N1_{MEDIAN}$ for the NOx sensor output is shown at point 140. Furthermore, assuming that the AIR/FUEL sensor 16 is operating effectively, the value of $\lambda$ falls within a $\lambda_{MEDIAN}$ band centered around value $\lambda_{MEDIAN}$.

When the AIR/FUEL sensor 16 deteriorates, it falsely indicates the value for $\lambda$. Thus, by comparing the value of $\lambda$ read from the AIR/FUEL sensor 16 when the output from the NOx sensor is at $N1_{MEDIAN}$ and comparing this with a previously determined $\lambda_{MEDIAN}$ band, deterioration of the AIR/FUEL sensor can be detected.

Figure 13:
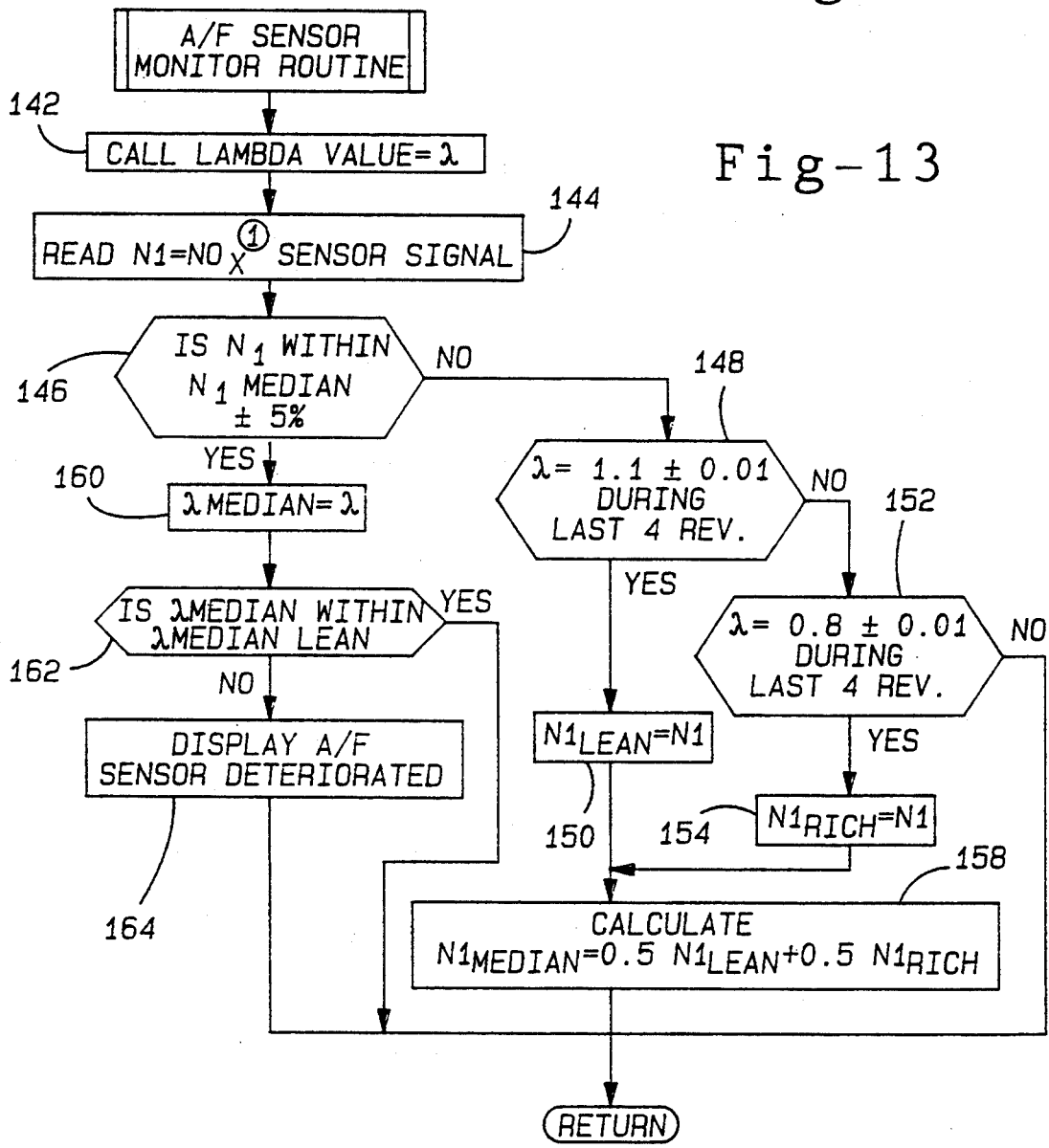
FIG. 13 is an algorithm of the AIR/FUEL sensor monitor routine.

With reference now to FIG. 13, FIG. 13 depicts the algorithm for monitoring the AIR/FUEL sensor. At step 142, the algorithm first determines the value of $\lambda$ and then branches to step 144 which reads the value N1 from the NOx1 sensor 22. Step 144 then branches to step 146 which compares the value of N1 with the previously calculated value $N1_{MEDIAN} \pm$ a small range, such as 5%.

Assuming that the value N1 is not sufficiently close to $N1_{MEDIAN}$, step 146 branches to step 148 which compares the value of $\lambda$ with a preselected lean burn condition, such as $\lambda = 1.1 \pm 0.01$. If this preselected lean burn condition exists, step 148 branches to step 150 which sets the value $N1_{lean}$ equal to the read value N1.

Conversely, if the value of $\lambda$ is not at the preselected lean bum condition of $\lambda = 1.1$, step 148 instead branches to step 152 which compares the value of $\lambda$ with a preselected rich combustion condition, such as $\lambda = 0.8 \pm 0.01$. If this rich condition exists, step 152 branches to step 154 and sets the value of $N1_{rich}$ equal to the read value N1 from the NOx1 sensor. Otherwise, step 152 branches to step 156 and exits from the AIR/FUEL sensor monitor routine.

Both steps 150 and 154 which respectively set the values of $N1_{lean}$ and $N1_{rich}$ branch to step 158. Step 158 then calculates the median value $N1_{MEDIAN}$ in accordance with the following formula:

$$N1_{MEDIAN} = \frac{N1_{lean} + N1_{rich}}{K}$$

Assuming that the value N1 read from the NOx sensor is within the value of $N1_{MEDIAN} \pm$ a preset range, step 146 branches to step 160 at which the variable $\lambda_{MEDIAN}$ is set to the value of $\lambda$ determined at step 142. Step 160 then branches to step 162.

At step 162, the variable $\lambda_{MEDIAN}$ is compared with a $\lambda_{MEDIAN}$ band which is a fixed value and typically determined by empirical means. If the value of $\lambda_{MEDIAN}$ is within the $\lambda_{MEDIAN}$ band, indicative of proper operation of the AIR/FUEL sensor, step 162 branches to step 156 a exits the AIR/FUEL sensor monitor routine.

Conversely, if the value of $\lambda_{MEDIAN}$ is not within the $\lambda_{MEDIAN}$ band, step 162 instead branches to step 164 which is indicative of an AIR/FUEL sensor malfunction. When this occurs, the CPU 42 (FIG. 5) activates the appropriate indicator means 60 thereby alerting the vehicle operator that maintenance is required.

MISFIRE MONITORING

Figure 14:
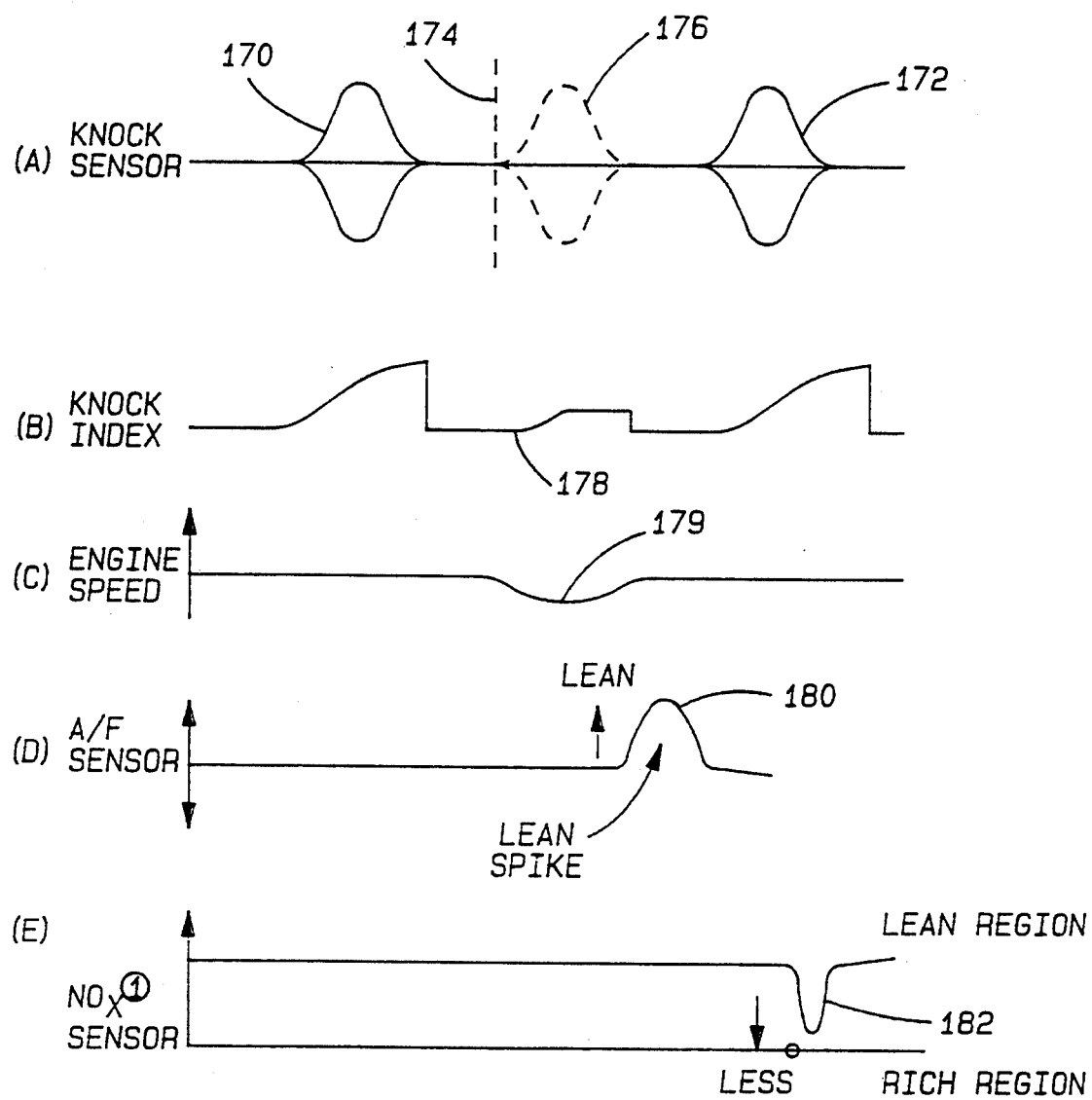
FIG. 14A–14E are graphs of various sensors during an engine misfire.

The system of the present invention can also be utilized to monitor engine misfiring. With reference then to FIG. 14A–FIG. 14E, FIG. 14 illustrates the phenomena which occurs during an engine misfire. FIG. 14A depicts the vibration as detected by a knock sensor which produces output signals shown at 170 and 172 for each engine combustion. An engine misfire is illustrated at time 174 which results in the absence of engine vibration immediately following the misfire as indicated by the phantom line 176.

FIG. 14B illustrates a knock index. The knock index falls, as illustrated at 178, below a predetermined $NOx_{THRESH}$ when a misfire occurs.

FIG. 14C illustrates the engine speed as a calculated value derived from the RPM sensor 12 (FIG. 2B) and a slight reduction of RPM, indicated at 179, a short time period after the time 174 of the misfire.

Since the fuel in the combustion chamber does not combust during an engine misfire, the exhaust from the engine is fuel rich which, accordingly, produces a fuel rich portion in the exhaust gas stream from the engine. This fuel rich portion is detected by the AIR/FUEL sensor 16 as a negative spike illustrated at 180 in FIG. 14D. Furthermore, since the AIR/FUEL sensor 16 is positioned downstream from the combustion chamber, the output spike 180 from the AIR/FUEL sensor 16 is delayed in time from the misfire time 174.

Similarly, since no fuel combustion occurs during an engine misfire, NOx is not produced by the engine misfire 174. This absence of NOx in the exhaust gas stream is illustrated in FIG. 14E as a negative spike 182 of the value N1 from the NOx1 sensor 22. This spike 182 from the NOx1 sensor, furthermore, is delayed in time somewhat from the AIR/FUEL sensor 16 since the NOx1 sensor 22 is positioned physically downstream from the AIR/FUEL sensor 16.

Figure 15:
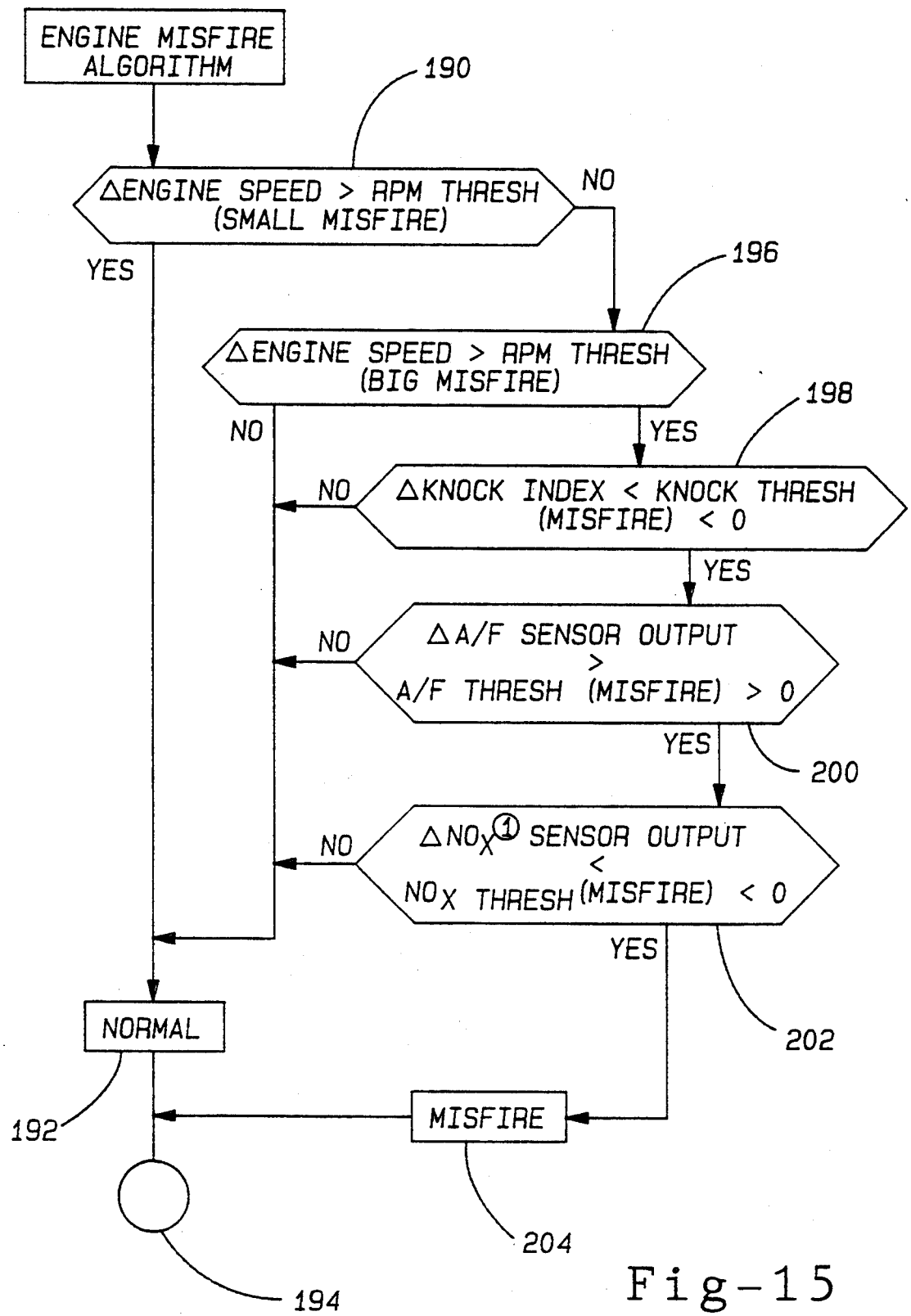
FIG. 15 is an algorithm for monitoring engine misfire.

With reference now to FIG. 15, an algorithm is thereshown for detecting engine misfiring. At step 190 the change in engine speed (see FIG. 14C) is compared to the RPM threshold value for a predefined "small" misfire which will be ignored by the monitoring system of the present invention. If the engine speed is greater than the small misfire, indicative that no misfire occurred, step 190 branches directly to 192, indicative of normal engine operation, and then exits from the engine misfire algorithm at step 194.

Conversely, if the decrease in engine speed is greater than the RPM threshold for a small misfire, step 190 instead branches to step 196 which compares the decrease in engine speed to the RPM threshold value for a large misfire. If the change in engine speed is less than a predefined "large" engine misfire, the misfire is within an acceptable range and step 196 branches to step 192 and then exits from the algorithm at step 194.

If the change in engine speed is greater than the RPM threshold for a large misfire, step 196 instead branches to step 198 which compares the knock index (FIG. 14B) with the knock threshold. If the knock index is greater than the knock threshold, indicative of normal engine operation, step 198 branches to step 192. Otherwise, step 198 branches to step 200.

At 200, the change in the output from the AIR/FUEL sensor is compared with a preset AIR/FUEL threshold value $A/F_{THRESH(MISFIRE)}$. If a change from the AIR/FUEL sensor output is less than the threshold value $AF_{THRESHOLD(MISFIRE)}$, step 200 branches to step 192 and then exits from the routine at step 194. Otherwise, step 200 branches to step 202.

At step 202, the change in the output signal from the NOx1 sensor (FIG. 14E) is compared with a preset threshold value $NOx_{THRESH(MISFIRE)}$. If the change in the NOx sensor output is less than its threshold value, indicative that only a small misfire has occurred, step 202 branches to step 192, indicating acceptable engine operation, and then exits from the routine at step 194. Otherwise, step 202 branches to step 204, indicative that an unacceptable misfire has occurred. At this time, the CPU 42 generates an output signal to the indicator means 60 to alert the vehicle operator that unacceptable misfiring has occurred.

ENGINE CONTROL

All the foregoing has dealt with monitoring various engine components, including the various engine sensors, in order to detect a malfunction or deterioration of the components and/or sensor. The sensor outputs, however, can also be used to control various engine operating functions in order to optimize engine operation and/or reduce engine emissions.

EXHAUST GAS RECIRCULATION CONTROL

Exhaust gas recirculation (EGR) has long been used to reduce the concentration of NOx in the exhaust gas from the engine. In exhaust gas recirculation, a portion of the engine exhaust is recirculated to the engine intake manifold. In doing so, the exhaust gases cool the combustion chamber of the engine and urges the following formula:

$$N_2 + O_2 \rightarrow 2NO$$

towards the left and thus towards harmless emissions. Furthermore, a small amount of EGR, i.e. 5–6%, is desirable for fuel economy. The optimum percent of EGR will, however, vary with aging of the engine. For example, carbonization of the engine after prolonged use affects heat transfer from the combustion chamber which, in turn, increases NOx and the amount of EGR necessary to reduce NOx to acceptable limits.

Figure 16:
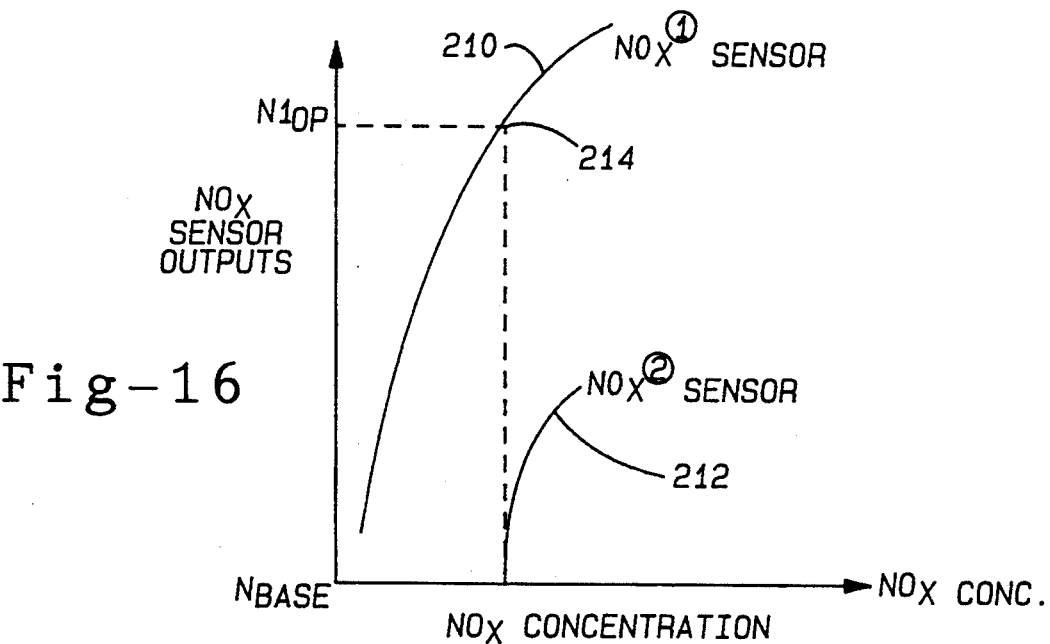
FIG. 16 is a graph of the output from the NOx1 and NOx2 sensors as a function of NOx concentration.

With reference to FIG. 16, the output N1 from the NOx1 sensor is illustrated as a function of the NOx concentration before the NOx converter 20 by graph 210. The output N2 from the second NOx sensor 24 is also illustrated in FIG. 16 by graph 212. Furthermore, at a predetermined level of NOx concentration illustrated at point 214, the NOx converter 20 eliminates essentially all of the NOx from the engine emissions so that the output N2 from the NOx2 sensor is essentially zero. Since there is no need to reduce NOx via the EGR system more than the NOx catalytic converter 20 can reduce, it is desirable to maintain the exhaust gas recirculation at the optimal amount of EGR at point 214 so that the output from the NOx1 sensor equals $N1_{OP}$. As discussed above, this value $N1_{OP}$ will vary with engine aging.

Figure 17:
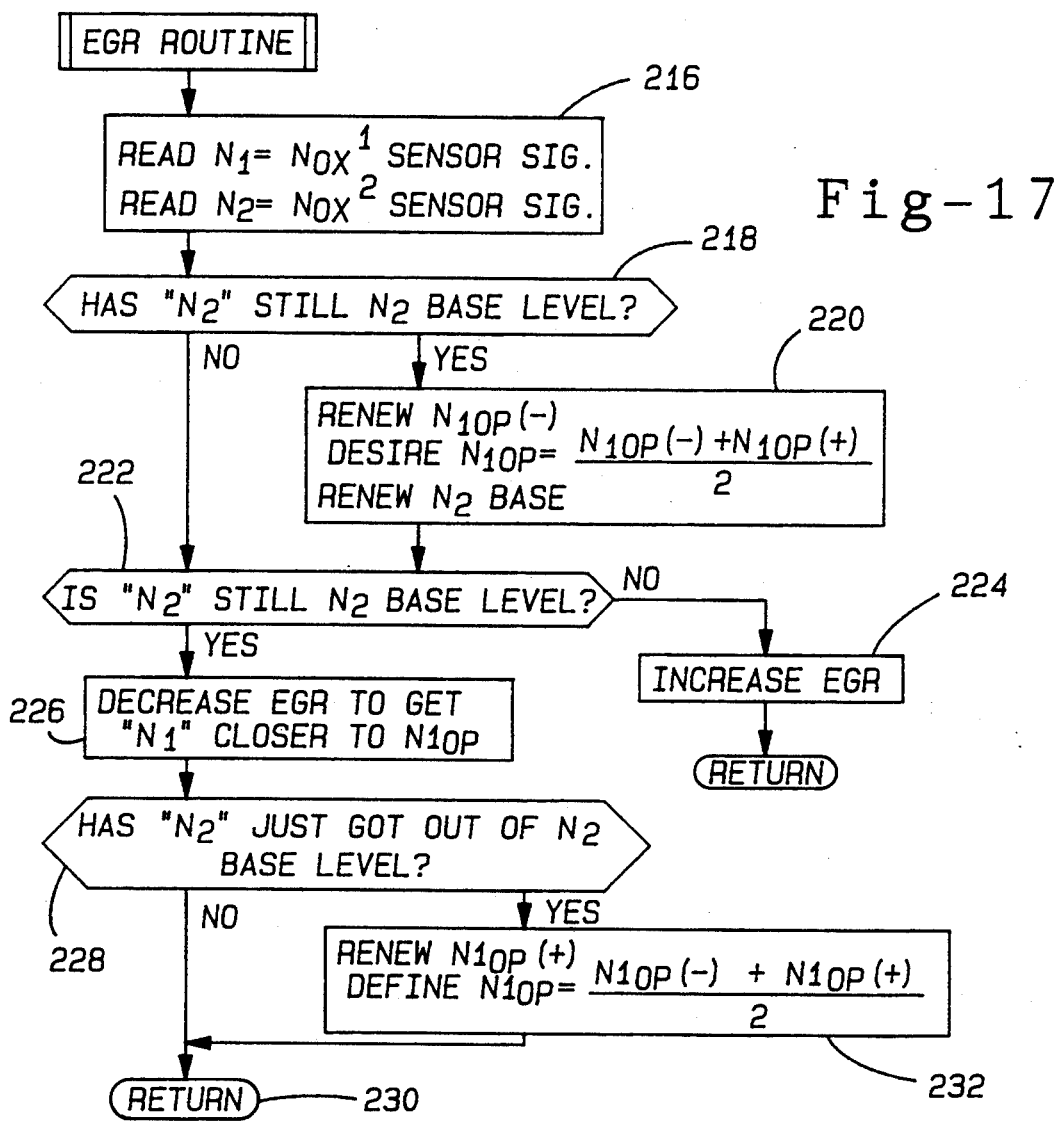
FIG. 17 is a flow chart for exhaust gas recirculation.

With reference now to FIG. 17, an algorithm for the EGR control is thereshown. At step 216 the values N1 and N2 are respectively read from the NOx1 sensor 22 and NOx2 sensor 24. Step 216 then branches to step 218 which determines if the value N2 from the NOx2 sensor is at or below the base level $N2_{BASE}$ (FIG. 16). If so, step 218 branches to step 220 which sets the value $N1_{OP(-)}$ equal to N1 and then redefines the value for $N1_{OP}$ in accordance with the following formula:

$$N1_{OP} = \frac{N1_{OP(-)} + N1_{OP(+)}}{2}$$

Conversely, in the event that the output N2 from the NOx2 sensor has not entered into the N2 base level $N2_{BASE}$, step 218 branches directly to step 222. Step 220 also branches to step 222 after its redefinition of the value for $N1_{OP}$.

At step 222, the algorithm determines if the value N2 from the NOx2 sensor is still at the $N2_{BASE}$ level. If not, step 222 branches to step 224 which increases the exhaust recirculation and then returns from the $EGR_{ROUTINE}$.

Conversely, if the N2 value from the NOx2 sensor is still in the N2 base level, step 222 instead branches to step 226 at which time the central processing unit 42 generates an output signal to the EGR control 26 to decrease the EGR. In doing so, the signal N1 from the NOx1 sensor 22 will be moved closer to the optimal point and $N_{OP}$.

Step 226 then branches to step 228 which determines if the value N2 from the NOx2 sensor has increased past the $N2_{BASE}$ level. If not, step 228 branches to step 230 and exits from the EGR control routine. Otherwise, step 228 branches to step 232 which assigns the current value N1 from the NOx1 sensor as $N1_{OP(+)}$ and then redefines the value of $N1_{OP}$ by the following equation:

$$N1_{OP} = \frac{N1_{OP(-)} + N1_{OP(+)}}{2}$$

Step 232 then exits from the EGR routine via step 230.

By iteratively executing the EGR routine described above, the amount of EGR recirculation would be closely maintained around the optimum point $N_{OP}$ illustrated in FIG. 16. In doing so, the NOx converter 20 will be provided with only the amount of NOx that it can safely reduce so that the output from the NOx2 sensor 24, and thus the NOx emissions from the internal combustion engine, will be maintained at a minimal and acceptable level.

SECONDARY AIR CONTROL

In order to maintain the efficient operation of the three way catalytic converter 18, it is necessary that the converter 18 be maintained below preset temperature ranges. Otherwise, excessive temperatures in the converter 18 reduces efficiency and thus disadvantageously increases the overall emissions in the exhaust gas stream.

In order to prevent overheating of the converter 18, a secondary air system 34 (FIG. 2) is controlled by the CPU 42 to inject cool air into the converter 18 in order to prevent overheating of the converter 18. Preferably the secondary air is injected into the exhaust gas stream adjacent the exhaust port from the engine and toward the exhaust valve. Such injection of secondary air advantageously results in cooling of the exhaust valve and its associated structure. Furthermore, since the exhaust gas stream is still at an elevated temperature, some reduction in NOx occurs since the following equation is forced to the right:

$$NOx \rightleftharpoons N_2O_2$$

Figure 18:
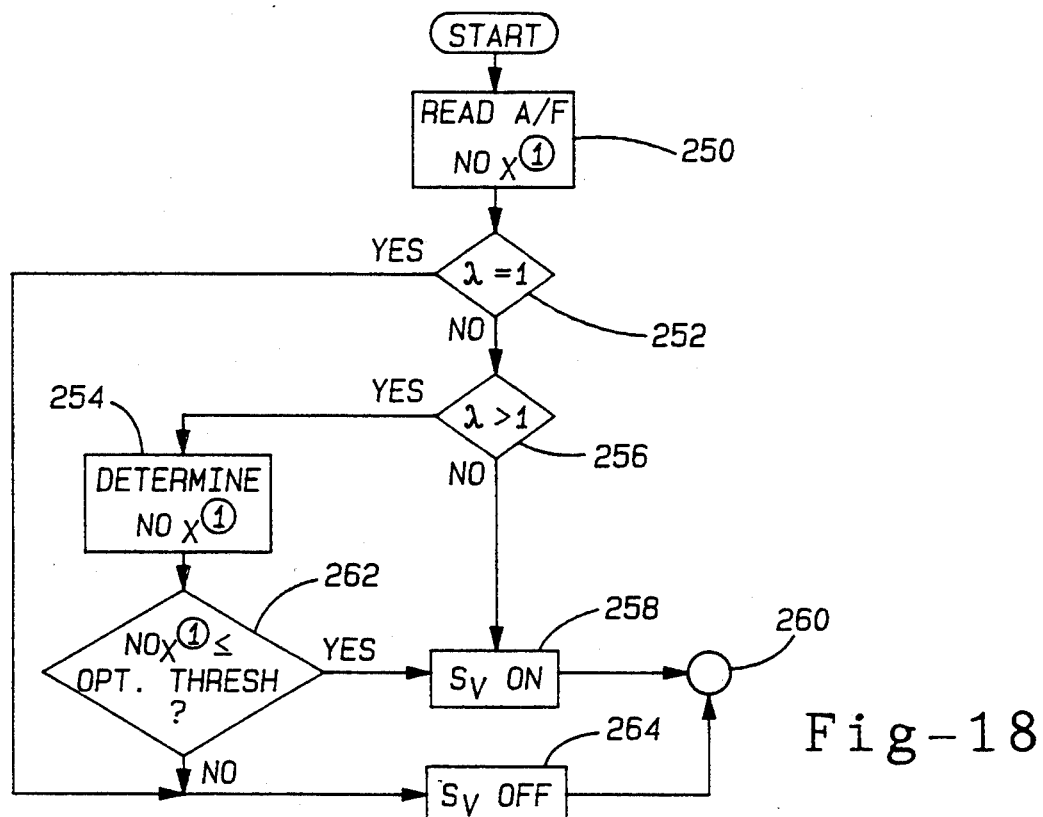
FIG. 18 is a flow chart for the introduction of secondary air into the three way catalytic converter.

With reference now to FIG. 18, an algorithm is thereshown for controlling the introduction of secondary air into the converter 18. At step 250, the algorithm first reads both the AIR/FUEL mixture from the A/F sensor 16, and the value N1 from the NOx1 sensor 22. Step 250 then branches to step 252.

At step 252, the algorithm first determines if the engine combustion is operating at the stoichiometric point, i.e. $\lambda=1$. If so, step 252 branches to step 264 which shuts off the secondary air valve and thus terminates secondary air into the exhaust gas stream.

If the engine combustion is not at the stoichiometric point, step 252 instead branches to step 256 which determines if $\lambda$ is greater than 1. If so, indicative of a lean burn situation, step 256 again branches to step 254. Otherwise $\lambda<1$, which would indicate a rich engine combustion condition, and step 256 branches to step 258.

At step 258, secondary air is desirable so that the engine central processing unit 42 generates control signals to the secondary air system 34 in order to introduce secondary air into the exhaust gas stream. Step 258 then exits from the secondary air routine at step 260.

Conversely, during either a stoichiometric or lean burn engine operation, step 254 branches to step 262 which compares the value N1 from the NOx1 sensor 22 with a predetermined threshold, e.g. $\lambda_{THRESH}=1.1$. If the value N1 from the NOx1 sensor exceeds the threshold amount $\lambda_{THRESH}$, step 262 branches to step 258 whereupon the secondary air is activated as previously described. Otherwise, the secondary air is shut off at step 264.

AIR ASSIST CONTROL

Figure 19:
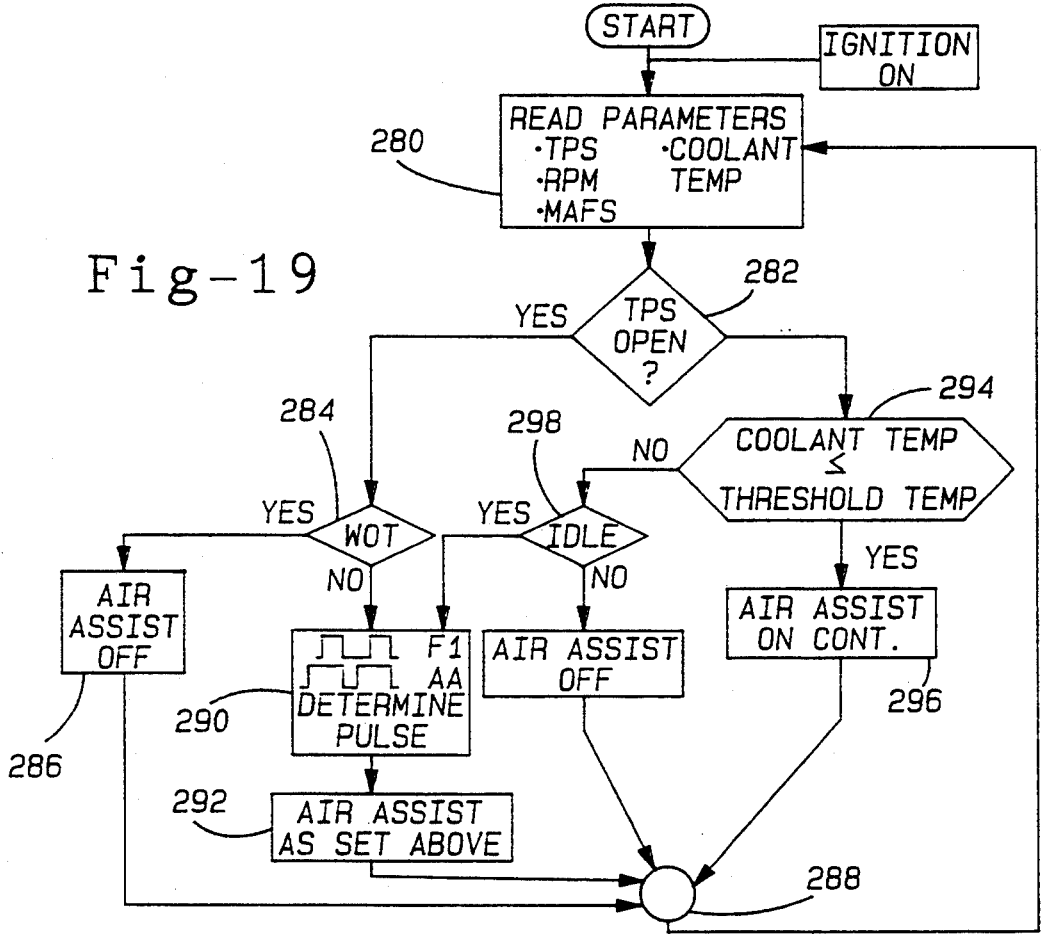
FIG. 19 is a flow chart illustrating the operation of an air assist valve for use in conjunction with fuel injection.

The air assist system 28 (FIG. 2) is utilized to inject additional air through the fuel injector nozzles into the engine in order to enhance the vaporization of the fuel and thus the efficiency of fuel combustion. An algorithm for controlling the operation of the air assist system 28 is shown in FIG. 19.

At step 280, the algorithm reads the values tier the throttle position sensor 15, engine RPM sensor 12, mass air flow sensor 14 and then branches to step 282. At step 282 the algorithm determines if the engine is currently at idle by comparing the signal from the throttle position sensor 15 to the idle position.

Assuming that the throttle is open, step 282 branches to step 284 which compares the signal from the throttle position sensor 15 with a predetermined wide open throttle value. If the throttle is at wide open throttle, maximum power is desired so that any air assist should be terminated. Consequently, during wide open throttle step 284 branches to step 286 where the central processing unit 42 generates a signal to the air assist system 28 to discontinue the air assist. Step 286 then branches to step 288 which then exits the air assist routine or, alternatively, reiterates the air assist routine 18 by branching again to step 280.

Conversely, assuming that the throttle is open, but not at wide open throttle, step 284 instead branches to step 290 which determines the optimal pulse width for the air assist AA with respect to the fuel injection pulse FI. The air assist is then activated at step 292 in accordance with the determination made at step 290 and step 292 then exits the routine via step 288.

Assuming that the throttle is closed, step 282 branches to step 294 which determines if the engine is in a cold start condition by comparing the engine coolant temperature with a threshold temperature. If so, step 294 branches to step 296. At step 296, the central processor 42 generates output signals to the air assist system 28 to continuously introduce air into the combustion cylinder. Step 296 then exits from the air assist routine through step 288.

If the throttle is closed during a warm engine condition, step 294 branches to step 298. At step 298, the algorithm determines if the engine is at an idle engine condition. Such a comparison can be made, for example, by comparison with the output signal from the RPM sensor 12 for the engine. If an engine idle condition is present, step 298 branches to step 290 which produces a pulsed air assist for the fuel injection in the previously described fashion. Conversely, if an idle condition is not present, as would occur during engine deceleration, step 298 exits to step 300 which turns off the air assist system 28.

CONCLUSION

In conclusion, it can be seen that the present invention provides a novel method and means for monitoring various engine components as well as controlling engine ignition and ignition exhaust emission components for an internal combustion engine.

It will be understood, of course, that all of the algorithms previously described will be reiteratively executed by the CPU 42. Furthermore, any and/or all of the algorithms may be executed by the CPU only when certain engine steady state conditions are present.

Having described our invention, however, many modifications thereto will become apparent to those skilled in the an to which it pertains without deviation from the spirit of the invention as defined by the scope of the appended claims.

We claim:

1. For use in conjunction with an internal combustion engine which emits nitric oxides as a part of its engine emissions, an exhaust system for the engine and means in said exhaust system for reducing undesirable engine emissions, an engine monitoring system comprising:

a plurality of sensors for detecting various engine operating conditions and for generating output signals representative thereof, at least one of said sensors comprising a gas sensor associated with said exhaust system which produces an output signal N1 indicative of the concentration of a preselected gas in the engine exhaust emissions, means responsive to the output signals from said sensors for indicating the state of selected engine components, wherein said means for reducing emissions in the engine exhaust comprises a three way catalytic converter which reduces hydrocarbons, nitric oxides and carbon monoxide in the exhaust gas stream, wherein said gas sensor is operatively positioned downstream from the three way converter and wherein said means for reducing emissions in the exhaust gas stream comprises a nitric oxide catalytic converter which receives the exhaust gas steam from the three way converter, and means for detecting a malfunction of the nitric oxide catalytic converter comprising:

a second gas sensor positioned in the exhaust gas stream downstream from the nitric oxide converter, said second gas sensor producing an output signal N2 which varies as a function of the concentration of nitric oxide in the exhaust gas stream, means for reading the output signal N1 from the first gas sensor and for reading the output signal N2 from the second sensor, means for generating an efficiency factor for the nitric oxide catalytic converter equal to the value (N1 - N2)/K where K is a preselected constant, means for comparing said efficiency factor to a preset threshold, and means for generating an output indicator signal when said efficiency factor exceeds said threshold.

2. The invention as defined in claim 1 wherein said preselected gas is nitric oxide.

3. The invention as defined in claim 1 wherein said sensors further comprise an air/fuel sensor which provides an output signal representative of the air/fuel ratio of the engine.

4. The invention as defined in claim 1 and comprising means for determining the air excess ratio of the engine combustion, and wherein said system includes means for detecting a malfunction of said gas sensor associated with said exhaust system said means for detecting a malfunction of said gas sensor associated with said exhaust system comprising:

means for determining if engine operation is substantially at a stoichiometric air/fuel ratio and means for then reading the output signal N1 from the gas sensor and for storing a stoichiometric value $N1_{STOIC}$, means for determining if engine operation is substantially at a predetermined lean air/fuel ratio and means for then reading the output signal N1 from the gas sensor and for storing a lean value $N1_{LEAN}$, means for calculating a signal ratio SR in accordance with the formula $SR = N1_{LEAN}/N1_{STOIC}$, means for comparing the calculated value of SR with a preset threshold for SR, and means for generating an output indicator signal when said calculated value for SR is less than said threshold value for SR.

5. The invention as defined in claim 1 wherein said sensors include a sensor which generates a signal representative of the air excess ratio, and wherein said system comprises means for detecting a malfunction of the three way converter comprising:

means for determining if engine operation is substantially at a predetermined rich air/fuel ratio and means for then reading the output signal N1 from the gas sensor and for storing a rich air/fuel value $N1_{RICH}$, means for determining if engine operation is substantially at a predetermined lean air/fuel ratio and means for then reading the output signal N1 from the gas sensor and for storing a lean air/fuel value $N1_{LEAN}$, means for calculating a threshold value $N1_{THRESH(TWC)}$ in accordance with the formula $N1_{THRESH(TWC)} = (N1_{RICH} + N1_{LEAN})/K$ where K is a preselected constant, means for determining if engine operation is substantially at stoichiometric air/fuel ratio and means for then reading the output signal N1 from the gas sensor and for storing a stoichiometric air/fuel value $N1_{STOIC}$, means for comparing said threshold value $N1_{STOIC}$ with the calculated threshold value $N1_{THRESH(TWC)}$ and for generating an output signal representative of a malfunction of the three way converter when $N1_{STOIC}$ exceeds $N1_{THRESH(TWC)}$.

6. The invention as defined in claim 1 wherein said sensor comprises an air/fuel sensor which generates an output signal representative of the air/fuel ratio of the engine, and wherein said system comprises means for detecting a malfunction of the air/fuel sensor comprising:

means for determining if engine operation is substantially at a preset rich air/fuel ratio and means for then reading the output signal N1 from the gas sensor and for storing a rich air/fuel value $N1_{RICH}$, means for determining if engine operation is substantially at a predetermined lean air/fuel ratio and means for then reading the output signal N1 from the gas sensor and for storing a lean air/fuel value $N1_{LEAN}$, means for calculating a median value $N1_{MEDIAN}$ in accordance with the formula $N1_{MEDIAN} = (N1_{RICH} + N1_{LEAN})/K$ where K is a preselected constant, means for reading the current output signal N1 from the gas sensor and for determining when current output signal N1 is within a preset range of $N1_{MEDIAN}$ for thereafter comparing the current air excess ratio with a present range of the air excess ratio, and means for generating an output signal indicative of a malfunction of the air/fuel sensor when the current air excess ration is outside said preset range of the air excess ratio.

7. The invention as defined in claim 1 wherein said engine sensors comprises an engine speed sensor, an engine knock sensor and an air/fuel sensor, and further comprising means for detecting an engine misfire comprising:

means for reading the output signals from the gas sensor, speed sensor, knock sensor and air/fuel sensor, means for comparing each said sensor output signal with preselected threshold values wherein one threshold value is associated with each sensor, and means for generating an indicator output signal indicative of an engine misfire when each said sensor output signal exceeds its associated threshold value.

8. The invention as defined in claim 1 wherein said gas sensor comprises titanium oxide.

9. The invention as defined in claim 1 wherein said gas sensor comprises tin oxide.

10. The invention as defined in claim 1 wherein said gas sensor comprises niobium oxide.

11. For use in conjunction with an internal combustion engine which emits nitric oxides as a part of its engine emissions, an exhaust system for the engine and means in said exhaust system for reducing undesirable engine emissions, an engine monitoring system comprising:

a plurality of sensors for detecting various engine operating conditions and for generating output signals representative thereof, at least one of said sensors comprising a gas sensor associated with said exhaust system which produces an output signal N1 indicative of the concentration of a preselected gas in the engine exhaust emissions, means responsive to the output signals from said sensors for indicating the state of selected engine operating conditions, wherein said engine sensors comprises an engine speed sensor, an engine knock sensor and an air/fuel sensor, and further comprising means for detecting an engine misfire comprising:

means for reading the output signals from the gas sensor, speed sensor, knock sensor and air/fuel sensor, means for comparing each said sensor output signal with preselected threshold values wherein one threshold value is associated with each sensor, and means for generating an indicator output signal indicative of an engine misfire when each said sensor output signal exceeds its associated threshold value.

12. The invention as defined in claim 11 wherein said preselected gas is nitric oxide.

13. The invention as defined in claim 11 wherein said sensors further comprise an air/fuel sensor which provides an output signal representative of the air/fuel ratio of the engine.

14. The invention as defined in claim 11 wherein said means for reducing emissions in the engine exhaust comprises a three way catalytic converter which reduces hydrocarbons, nitric oxides and carbon monoxide in the exhaust gas stream.

15. The invention as defined in claim 14 wherein said gas sensor is operatively positioned downstream from the three way converter and wherein said means for reducing emissions in the exhaust gas stream comprises a nitric oxide catalytic converter which receives the exhaust gas stream from the three way converter, and means for detecting a malfunction of the nitric oxide catalytic converter comprising:

a second gas sensor positioned in the exhaust gas stream downstream from the nitric oxide converter, said second gas sensor producing an output signal N2 which varies as a function of the concentration of nitric oxide in the exhaust gas stream, means for reading the output signal N1 from the first gas sensor and for reading the output signal N2 from the second sensor, means for generating an efficiency factor for the nitric oxide catalytic converter equal to the value (N1 - N2)K where K is a preselected constant, means for comparing said efficiency factor to a preset threshold, and means for generating an output indicator signal when said efficiency factor exceeds said threshold.

16. The invention as defined in claim 11 and comprising means for determining the air excess ratio of the engine combustion, and wherein said system includes means for detecting a malfunction of said gas sensor associated with said exhaust system, said means for detecting a malfunction of said gas sensor associated with said exhaust system comprising:

means for determining if engine operation is substantially at a stoichiometric air/fuel ratio and means for then reading the output signal N1 from the gas sensor and for storing a stoichiometric value $N1_{STOIC}$, means for determining if engine operation is substantially at a predetermined lean air/fuel ratio and means for then reading the output signal N1 from the gas sensor and for storing a lean value $N1_{LEAN}$, means for calculating a signal ratio SR in accordance with the formula $SR = N1_{LEAN}/N1_{STOIC}$, means for comparing the calculated value of SR with a preset threshold for SR, and means for generating an output indicator signal when said calculated value for SR is less than said threshold value for SR.

17. The invention as defined in claim 14 wherein said sensors include a sensor which generates a signal representative of the air excess ratio, and wherein said system comprises means for detecting a malfunction of the three way converter comprising:

means for determining if engine operation is substantially at a predetermined rich air/fuel ratio and means for then reading the output signal N1 from the gas sensor and for storing a rich air/fuel value $N1_{RICH}$, means for determining if engine operation is substantially at a predetermined lean air/fuel ratio and means for then reading the output signal N1 from the gas sensor and for storing a lean air/fuel value $N1_{LEAN}$, means for calculating a threshold value $N1_{THRESH(TWC)}$ in accordance with the formula $N1_{THRESH(TWC)} = (N1_{RICH} + N1_{LEAN})/K$ where K is a preselected constant, means for determining if engine operation is substantially at stoichiometric air/fuel ratio and means for then reading the output signal N1 from the gas sensor and for storing a stoichiometric air/fuel value $N1_{STOIC}$, means for comparing said threshold value $N1_{STOIC}$ with the calculated threshold value $N1_{THRESH(TWC)}$ and for generating an output signal representative of a malfunction of the three way converter when $N1_{STOIC}$ exceeds $N1_{THRESH(TWC)}$.

18. The invention as defined in claim 11 wherein said sensor comprises an air/fuel sensor which generates an output signal representative of the air/fuel ratio of the engine, and wherein said system comprises means for detecting a malfunction of the air/fuel sensor comprising:

means for determining if engine operation is substantially at a preset rich air/fuel ratio and means for then reading the output signal N1 from the gas sensor and for storing a rich air/fuel value $N1_{RICH}$, means for determining if engine operation is substantially at a predetermined lean air/fuel ratio and means for then reading the output signal N1 from the gas sensor and for storing a lean air/fuel value $N1_{LEAN}$, means for calculating a median value $N1_{MEDIAN}$ in accordance with the formula $N1_{MEDIAN} = (N1_{RICH} + N1_{LEAN})/K$ where K is a preselected constant, means for reading the current output signal N1 from the gas sensor and for determining when current output signal N1 is within a preset range of $N1_{MEDIAN}$ for thereafter comparing the current air excess ratio with a present range of the air excess ratio and means for generating an output signal indicative of a malfunction of the air/fuel sensor when the current air excess ration is outside said preset range of the air excess ratio.

19. The invention as defined in claim 11 wherein said gas sensor comprises titanium oxide.

20. The invention as defined in claim 11 wherein said gas sensor comprises tin oxide.

21. The invention as defined in claim 11 wherein said gas sensor comprises niobium oxide.

22. For use in conjunction with an internal combustion engine which emits nitric oxides as a pan of its engine emissions, an exhaust system for the engine, means in said exhaust system for reducing undesirable engine emissions comprising a three way converter, and further comprising a plurality of control means for varying engine operating parameters, an engine emission reduction system comprising:

a plurality of sensors for detecting various engine operating conditions and for generating output signals representative thereof, at least one of said sensors comprising a gas sensor associated with said exhaust system which produces an output signal indicative of the concentration of a preselected gas in the engine exhaust emissions, means responsive to the output signals from said sensors for regulating said control means during preselected engine operating conditions in a fashion to reduce undesirable engine emissions during said preselected engine operation conditions, wherein said regulating means comprises means to recirculate a portion of the exhaust emissions from the engine to the intake for the engine, wherein said exhaust system includes a nitric oxide catalytic converter capable of reducing a preset concentration of nitric oxide, and wherein said system comprises means for detecting the emissions of nitric oxide from the exhaust from the exhaust system, and means for controlling said recirculation means so that the quantity of exhaust gas recirculation is sufficient to reduce the nitric oxide concentration in the exhaust gas stream to said preset concentration.

23. The invention as defined in claim 22 wherein said preselected gas is nitric oxide.

24. The invention as defined in claim 22 and comprising means for introducing air into said three way converter, means for determining the air/fuel ratio, and means for activating said air introducing means when the air/fuel ratio is in a lean or stoichiometric condition and the value from the gas sensor exceeds a preset threshold.

25. The invention as defined in claim 22 wherein said sensors comprise a throttle sensor which produces an output signal indicative of the position of the throttle, wherein the engine includes fuel injectors and means for selectively introducing air into the fuel injectors, means for controlling the introduction of air into the fuel injectors comprising:

means for reading the throttle position sensor, means responsive to a throttle open condition less than wide open throttle for activating the fuel injector air introducing means in pulses synchronized with the injection of fuel by the fuel injectors.

26. For use in conjunction with an internal combustion engine which emits nitric oxides as a part of its engine emissions, an exhaust system for the engine and means in said exhaust system for reducing undesirable engine emissions, an engine monitoring system comprising:

a plurality of sensors for detecting various engine operating conditions and for generating output signals representative thereof, at least one of said sensors comprising a gas sensor associated with said exhaust system which produces an output signal N1 indicative of the concentration of a preselected gas in the engine exhaust emissions, means responsive to the output signals from said sensors for indicating the state of selected engine components, means for determining the air excess ratio of the engine combustion, and wherein said system includes means for detecting a malfunction of said gas sensor associated with said exhaust system, said means for detecting a malfunction of said gas sensor associated with said exhaust system comprising:

means for determining if engine operation is substantially at a stoichiometric air/fuel ratio and means for then reading the output signal N1 from the gas sensor and for storing a stoichiometric value $N1_{STOIC}$, means for determining if engine operation is substantially at a predetermined lean air/fuel ratio and means for then reading the output signal N1 from the gas sensor and for storing a lean value $N1_{LEAN}$, means for calculating a signal ratio SR in accordance with the formula $SR = N1_{LEAN}/NI_{STOIC}$, means for comparing the calculated value of SR with a preset threshold for SR, and means for generating an output indicator signal when said calculated value for SR is less than said threshold value for SR.

27. For use in conjunction with an internal combustion engine which emits nitric oxides as a pan of its engine emissions, an exhaust system for the engine and means in said exhaust system for reducing undesirable engine emissions, an engine monitoring system comprising:

a plurality of sensors for detecting various engine operating conditions and for generating output signals representative thereof, at least one of said sensors comprising a gas sensor associated with said exhaust system which produces an output signal N1 indicative of the concentration of a preselected gas in the engine exhaust emissions, means responsive to the output signals from said sensors for indicating the state of selected engine components, wherein said sensor comprises an air/fuel sensor which generates an output signal representative of the air/fuel ratio of the engine, and wherein said system comprises means for detecting a malfunction of the air/fuel sensor comprising:

means for determining if engine operation is substantially at a preset rich air/fuel ratio and means for then reading the output signal NI from the gas sensor and for storing a rich air/fuel value $N1_{RICH}$, means for determining if engine operation is substantially at a predetermined lean air/fuel ratio and means for then reading the output signal N1 from the gas sensor and for storing a lean air/fuel value $N1_{LEAN}$, means for calculating a median value $N1_{MEDIAN}$ in accordance with the formula $N1_{MEDIAN} = (N1_{RICH} + N1_{LEAN})/K$ where K is a preselected constant, means for reading the current output signal N1 from the gas sensor and for determining when current output signal N1 is within a preset range of $N1_{MEDIAN}$ for thereafter comparing the current air excess ratio with a present range of the air excess ratio, and means for generating an output signal indicative of a malfunction of the air/fuel sensor when the current air excess ration is outside said preset range of the air excess ratio.

28. For use in conjunction with an internal combustion engine which emits nitric oxides as a pan of its engine emissions, an exhaust system for the engine, means in said exhaust system for reducing undesirable engine emissions comprising a three way converter, and further comprising a plurality of control means for varying engine operating parameters, an engine emission reduction system comprising:

a plurality of sensors for detecting various engine operating conditions and for generating output signals representative thereof, at least one of said sensors comprising a gas sensor associated with said exhaust system which produces an output signal indicative of the concentration of a preselected gas in the engine exhaust emissions, means responsive to the output signals from said sensors for regulating said control means during preselected engine operating conditions in a fashion to reduce undesirable engine emissions during said preselected engine operation conditions, means for introducing air into said three way converter, means for determining the air/fuel ratio, and means for activating said air introducing means when the air/fuel ratio is in a lean or stoichiometric condition and the value from the gas sensor exceeds a preset threshold.

29. The invention as defined in claim 28 and comprising means for activating said air introducing means during a rich air/fuel engine operating condition.

30. For use in conjunction with an internal combustion engine which emits nitric oxides as a part of its engine emissions, an exhaust system for the engine, means in said exhaust system for reducing undesirable engine emissions comprising a three way converter, and further comprising a plurality of control means for varying engine operating parameters, an engine emission reduction system comprising:

a plurality of sensors for detecting various engine operating conditions and for generating output signals representative thereof, at least one of said sensors comprising a gas sensor associated with said exhaust system which produces an output signal indicative of the concentration of a preselected gas in the engine exhaust emissions, means responsive to the output signals from said sensors for regulating said control means during preselected engine operating conditions in a fashion to reduce undesirable engine emissions during said preselected engine operation conditions, wherein said sensors comprise a throttle sensor which produces an output signal indicative of the position of the throttle, wherein the engine includes fuel injectors and means for selectively introducing air into the fuel injectors, means for controlling the introduction of air into the fuel injectors comprising:

means for reading the throttle position sensor, means responsive to a throttle open condition less than wide open throttle for activating the fuel injector air introducing means in pulses synchronized with the injection of fuel by the fuel injectors.

31. The invention as defined in claim 30 wherein said air introducing pulses precede their associated fuel injection pulse by a predetermined amount.

32. The invention as defined in claim 30 and comprising means for activating the fuel injector air introducing means in pulses synchronized with the injection of fuel by the fuel injector during a warm engine, idle operating condition.

33. The invention as defined in claim 32 wherein said air introducing pulses precede their associated fuel injection pulse by a predetermined amount.

34. The invention as defined in claim 30 and comprising means for continuously activating said fuel injector air introducing means during a throttle closed, cold engine operating condition.

* * * * *

UNITED STATES PATENT AND TRADEMARK OFFICE
CERTIFICATE OF CORRECTION

PATENT NO. : 5,426,934

DATED : June 27, 1995

INVENTOR(S) : Frank W. Hunt et al.

Page 1 of 2

It is certified that error appears in the above-indentified patent and that said Letters Patent is hereby corrected as shown below:

```
Column 4, line 15, "truces" should be --trucks--.
Column 5, line 42, "stem" should be --system--.
Column 6, line 52, "alcove" should be --above--.
Column 7, line 53, "NI" should be --N1--.
Column 7, line 67, "SP" should be --SR--.
```
Column 9, line 4, after "$N1_{THRESH(TWC)} = \frac{N1_{lean} + N1_{rich}}{K}$"

insert --where K is a constant, e.g. 2"

```
Column 9, line 65, "bum" should be --burn--.
```
Column 10, line 12, after "$N1_{MEDIAN} = \frac{N1_{lean} + N1_{rich}}{K}$"

insert "where K is a constant, e.g. 2".
```
Column 10, line 24, "a" should be --and--.
Column 11, line 11, after "engine" delete ",".
Column 12, line 49, "N_OP" should be --N1_OP--.
Column 12, line 66, "N_OP" should be --N1_OP--.
Column 13, line 51, "bum" should be --burn.
Column 13, line 66, "tier" should be --for--.
Column 14, line 59, "an" should be --art--.
Column 15, line 22, "steam" should be --stream--.
Column 18, line 6, after "(N1-N2)" insert --/--.
Column 19, line 34, "pan" should be --part--.
Column 20, line 61, "pan" should be --part--.
```

UNITED STATES PATENT AND TRADEMARK OFFICE
CERTIFICATE OF CORRECTION

PATENT NO. : 5,426,934
DATED : June 27, 1995
INVENTOR(S) : Frank W. Hunt et al.

It is certified that error appears in the above-indentified patent and that said Letters Patent is hereby corrected as shown below:

```
Column 21, line 16, "NI" should be --N1--.
Column 21, line 39, "pan" should be --part --.
```

Signed and Sealed this

Twenty-third Day of January, 1996

Attest:

BRUCE LEHMAN

*Attesting Officer*  *Commissioner of Patents and Trademarks*